United States Patent
Ha

(10) Patent No.: US 11,695,626 B2
(45) Date of Patent: Jul. 4, 2023

(54) METHOD AND APPARATUS FOR OFFLOADING HARDWARE TO SOFTWARE PACKAGE

(71) Applicant: Samsung Electronics Co., Ltd., Suwon-si (KR)

(72) Inventor: Jihun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/506,429

(22) Filed: Oct. 20, 2021

(65) Prior Publication Data

US 2022/0094597 A1   Mar. 24, 2022

Related U.S. Application Data

(63) Continuation of application No. PCT/KR2021/012931, filed on Sep. 23, 2021.

(30) Foreign Application Priority Data

Sep. 24, 2020   (KR) .......................... 10-2020-0123995

(51) Int. Cl.
*G06F 15/177* (2006.01)
*H04L 41/0813* (2022.01)
(Continued)

(52) U.S. Cl.
CPC ......... *H04L 41/0813* (2013.01); *H04W 28/16* (2013.01); *H04W 84/042* (2013.01)

(58) Field of Classification Search
CPC .......................... H04L 41/0813; H04W 28/16
(Continued)

(56) References Cited

U.S. PATENT DOCUMENTS 9,858,214 B2    1/2018  Chhabra et al.
2006/0058940 A1 3/2006  Kumagai et al.
(Continued)

FOREIGN PATENT DOCUMENTS

CN    109522090 A    3/2019
EP    1086421 A1     3/2001
(Continued)

OTHER PUBLICATIONS

International Search Report and Written Opinion of the International Searching Authority in connection with International Application No. PCT/KR2021/012931 dated Dec. 27, 2021, 20 pages.

(Continued)

*Primary Examiner* — Hee Soo Kim

(57) ABSTRACT

A method, performed by a server, of executing a software package in a wireless communication system includes: obtaining package usage information for each of a plurality of software packages with respect to user equipment's (UEs) accessing a plurality of base stations (BSs) connected to the server; determining a first hardware component (HC) set, including a plurality of HCs, for processing tasks operating in a first software package from among the plurality of software packages, based on the package usage information including a use for each of the plurality of HCs included in the first HC set and a respective usage amount for the plurality of HCs; generating a second software package that is allocated to the first HC set; migrating the tasks operating in the first software package to the second software package; and deleting the first software package.

20 Claims, 12 Drawing Sheets

(51) Int. Cl.
*H04W 28/16* (2009.01)
*H04W 84/04* (2009.01)

(58) Field of Classification Search
USPC .......................................................... 709/221
See application file for complete search history.

(56) References Cited

U.S. PATENT DOCUMENTS

| | | | |
|---|---|---|---|
| 2016/0212017 A1 | 7/2016 | Li et al. | |
| 2017/0061566 A1* | 3/2017 | Min | H04L 47/822 |
| 2018/0359617 A1 | 12/2018 | Duan | |
| 2019/0158606 A1* | 5/2019 | Guim Bernat | H04L 67/34 |
| 2020/0125389 A1* | 4/2020 | Palermo | G06F 9/45558 |
| 2020/0167205 A1* | 5/2020 | Guim Bernat | H04L 9/3213 |
| 2020/0275313 A1* | 8/2020 | He | H04W 28/0983 |
| 2020/0383115 A1 | 12/2020 | Kim et al. | |

FOREIGN PATENT DOCUMENTS

| | | | |
|---|---|---|---|
| KR | 20180022500 A | 3/2018 | |
| KR | 10-1953906 B1 | 6/2019 | |
| KR | 10-2020-0017589 A | 2/2020 | |
| WO | 2019241171 A1 | 12/2019 | |
| WO | WO-2019241171 A1 * | 12/2019 | ........ G06F 11/3409 |

OTHER PUBLICATIONS

"Planning-Catch up with new technologies, How are FPGAs, ASICs, and SoCs different?", Aug. 23, 2004, 1 page.
"Current state and future directions of GPU virtualization technology in the Cloud computing for improving AI performance", Feb. 26, 2020, 39 pages.
Ian Cutress, "Intel To Acquire eASIC: Lower Cost ASICs in FPGA Design Time", AnandTech, Jul. 12, 2018, 3 pages.
"Intel eASIC Devices", https://www.intel.com/content/www/us/en/products/programmable/asic/easic-devices.html, 2 pages.
"Other diagrams (component, deployment, package diagram)", Dreaming Earth Developers, Phang's IT Blog, May 19, 2019, 3 pages.
Park et al., "Parallel LDPC Decoder for CMMB on CPU and GPU Using OpenCL", Dec. 2016, 10 pages.
"Software Engineering—[Lecture 15] Other diagrams (components, packages, distribution diagrams)", Computer Science/Soft Engineering, Jan. 2017, 4 pages.
"What is the 5G User Plane Function (UPF)?", https://www.metaswitch.com/knowledge-center/reference/what-is-the-5g-user-plane-function-upf, 3 pages.
"Scalability", Wikipedia, https://en.wikipedia.org/wiki/Scalability, Aug. 4, 2021, 6 pages.
"Network function virtualization", Wikipedia, https://en.wikipedia.org/wiki/Network_function_virtualization, Oct. 27, 2021, 11 pages.

* cited by examiner

METHOD AND APPARATUS FOR OFFLOADING HARDWARE TO SOFTWARE PACKAGE

CROSS-REFERENCE TO RELATED APPLICATIONS

This application is a continuation of International Patent Application No. PCT/KR2021/012931 filed on Sep. 23, 2021, which claims priority to Korean Patent Application No. 10-2020-0123995 filed on Sep. 24, 2020, the disclosures of which are herein incorporated by reference in their entirety.

BACKGROUND

1. Field

The disclosure relates to a method and apparatus for offloading hardware to a software package, and more particularly, to a method and apparatus for determining a hardware component set optimized for a plurality of software packages and applying the hardware component set to one of the plurality of software packages.

2. Description of Related Art

To meet increasing demand with respect to wireless data traffic after the commercialization of $4^{th}$ generation (4G) communication systems, efforts have been made to develop advanced $5^{th}$ generation (5G) communication system or pre-5G communication system. For this reason, 5G or pre-5G communication systems are called 'beyond 4G network' communication systems or 'post long term evolution (post-LTE)' systems.

To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed.

The Internet has evolved from a human-based connection network, where humans create and consume information, to the Internet of things (IoT), where distributed components such as objects exchange information with each other to process the information. Internet of everything (IoE) technology has emerged, in which the IoT technology is combined with, for example, technology for processing big data through connection with a cloud server. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication systems such as sensor networks, machine-to-machine (M2M) communication, machine-type communication (MTC), or the like are implemented by using techniques including beamforming, multiple-input and multiple-output (MIMO), array antennas, or the like. Application of cloud radio access network (Cloud-RAN) as the above-described big data processing technology may be an example of convergence of 5G communication technology and IoT technology.

Because various technologies can be applied due to the aforementioned technical features and the development of wireless communication systems, methods for efficiently managing a RAN by using such various technologies are required.

Embodiments of the disclosure may provide a method and apparatus for executing a virtualized network function, in preparation for a change in traffic or service usage which occurs in a wireless communication system.

SUMMARY

According to an embodiment of the disclosure as a technical solution to the problem, a method, performed by a server, of executing a software package in a wireless communication system may include: obtaining package usage information for each of a plurality of software packages with respect to user equipment's (UEs) accessing a plurality of base stations (BSs) connected to the server; determining a first hardware component (HC) set, including a plurality of HCs, for processing tasks operating in a first software package from among the plurality of software packages, based on the package usage information including a use for each of the plurality of HCs included in the first HC set and a respective usage amount for the plurality of HCs; generating a second software package that is allocated to the first HC set; migrating the tasks operating in the first software package to the second software package; and deleting the first software package.

According to another embodiment of the disclosure, the method may further include: before generating the second software package, checking the respective usage amounts of the plurality of HCs applied to the first software package; when there is a HC of which usage amount is equal to or greater than a threshold value from among the plurality of HCs, determining a second HC set for processing tasks operating in a third software package using the HC of which usage amount is equal to or greater than the threshold value, based on the package usage information; generating a fourth software package that is allocated to the second HC; migrating the tasks operating in the third software package to the fourth software package; and deleting the third software package.

According to another embodiment of the disclosure, the first HC set may be determined by comparing preset threshold values with each of an amount of traffic and a mobile edge computing (MEC) service usage amount occurring at the UEs at a particular time.

According to another embodiment of the disclosure, when it is identified that at least one of an amount of traffic or an MEC service usage amount is predicted to occur by the UEs at a particular time exceeds a threshold value, the allocating of the first HC set to the second software package may be performed before the particular time.

According to another embodiment of the disclosure, the method may further include obtaining event information about an event scheduled for the plurality of BSs and causing a change in traffic or an MEC service usage, wherein the package usage information for each of the plurality of software packages with respect to the UEs accessing the plurality of BSs connected to the server includes traffic and an MEC service usage amount which previously occurred in the plurality of BSs due to each event, and the first HC set is determined based on an amount of traffic and an MEC service usage amount which are to occur in the plurality of BSs according to the obtained event information, based on expected amount of traffic and the MEC service usage amount due to the each event.

According to another embodiment of the disclosure, each of the plurality of software packages may include at least one of a virtualized RAN (vRAN) package, an MEC package, or a user plane function (UPF) package.

According to another embodiment of the disclosure, each of the plurality of HCs may include at least one of a central processing unit (CPU), a graphics processing unit (GPU), a field programmable gate array (FPGA), or a network interface controller (NIC).

According to an embodiment of the disclosure as a technical solution to the problem, a server for executing a software package in a wireless communication system may include: a communicator; a memory storing a plurality of instructions; and at least one processor configured to execute the plurality of instructions to obtain package usage information for each of a plurality of software packages with respect to user equipment's (UEs) accessing a plurality of base stations (BSs) connected to the server, determine a first hardware component (HC) set, including a plurality of HCs for processing tasks operating in a first software package from among the plurality of software packages, based on the package usage information including a use for each of the plurality of HCs included in the first HC set and a respective usage amount for the plurality of HCs, generate a second software package that is allocated to the first HC set, migrate the tasks operating in the first software package to the second software package, and delete the first software package.

According to an embodiment of the disclosure, provided is a computer-readable recording medium having recorded thereon a computer program for executing the method.

In addition, provided is a computer-readable recording medium having recorded thereon a computer program for executing other methods, systems, and the method which are for implementing the disclosure.

According to the disclosure, as required optimal hardware is allocated to each of components of a software package, a remaining hardware resource can be allocated to other software package or other component, such that a system resource, particularly, a hardware resource can be efficiently used and managed even when a service usage is increased.

Also, as a hardware resource is virtualized, a system resource can be further efficiently managed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
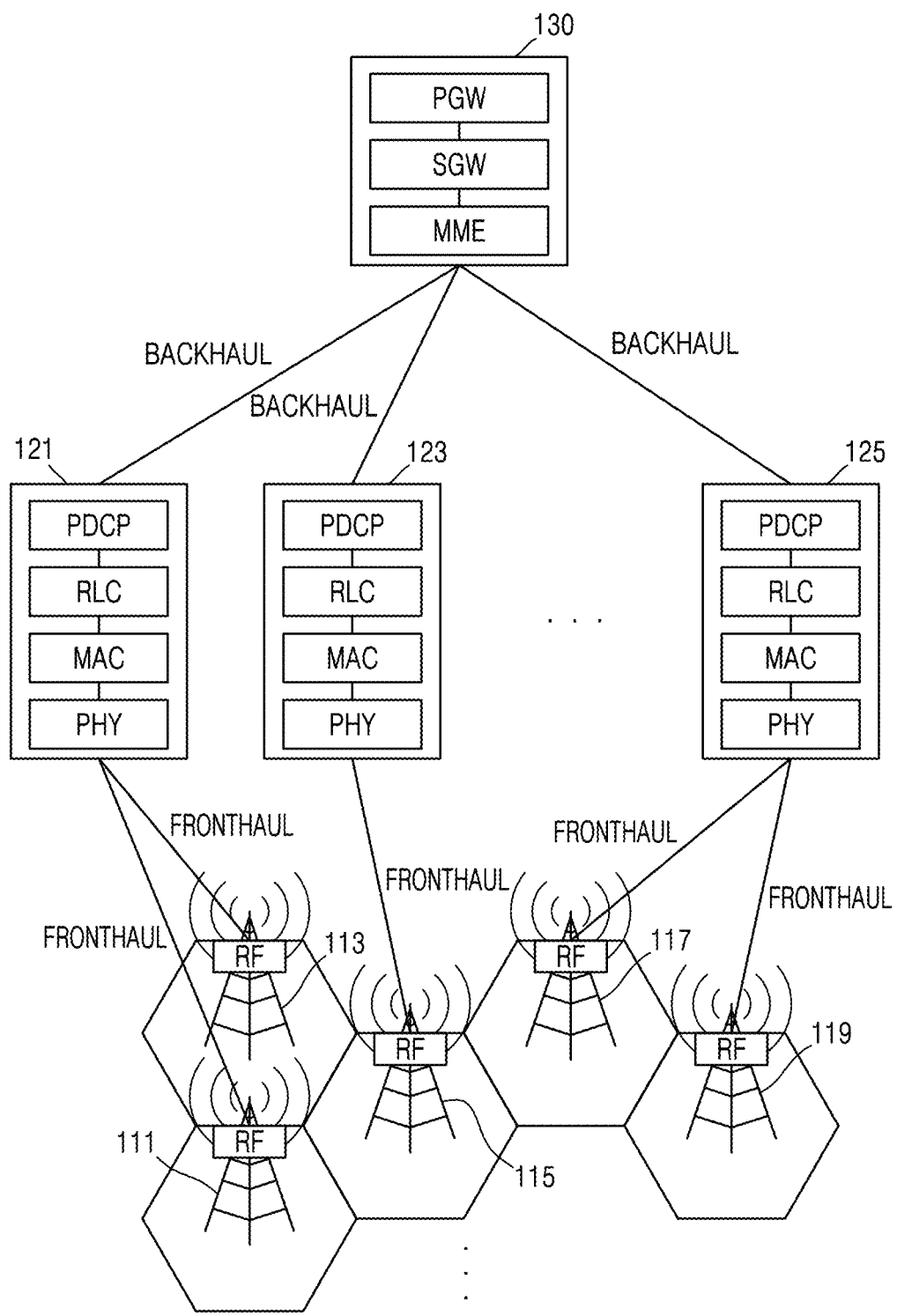
FIG. 1 is a diagram for describing a structure of a centralized/cloud radio access network (cRAN).

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Embodiments of the disclosure will now be described more fully with reference to the accompanying drawings. In the following description of embodiments of the disclosure, descriptions of techniques that are well known in the art and not directly related to the disclosure are omitted. This is to clearly convey the gist of the disclosure by omitting an unnecessary explanation.

For the same reason, some components in the drawings are exaggerated, omitted, or schematically illustrated. Also, the size of each component does not entirely reflect the actual size. In the drawings, the same or corresponding components are denoted by the same reference numerals.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. In the specification, the same components are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer-implementable process such that the instructions that are executed on the computer or other programmable apparatus provide steps for implementing the functions specified in the flowchart block(s).

In addition, each block of the flowchart illustrations may represent a module, a segment, or part of code, which includes one or more executable instructions for performing specified logical function(s). Also, it should be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Here, the term "~unit", as used in the present embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in an embodiment of the disclosure.

A wireless communication system has been developed from a wireless communication system providing voice centered services in the early stage toward a broadband wireless communication system providing high-speed, high-quality packet data services, like communication standards of high speed packet access (HSPA), long term evolution (LTE or evolved universal terrestrial radio access (E-UTRA)), LTE-A, and LTE-Pro of the 3GPP, high rate packet data (HRPD) and ultra mobile broadband (UMB) of 3GPP2, 802.16e of the Institute of Electrical and Electronic Engineers (IEEE), or the like. Also, as a next generation wireless communication system, a $5^{th}$ generation (5G) or new radio (NR) wireless communication system is being established.

In the next generation wireless communication system, at least one of services including enhanced Mobile BroadBand (eMBB), massive Machine Type Communications (mMTC), and Ultra-Reliable and Low-Latency Communications (URLLC) may be provided to a user equipment (UE). The services may be provided to a same UE or different UEs during a same time period. The eMBB service may be for high-speed transmission of high-volume data, the mMTC service may be for minimization of power consumption by the terminal and accesses by multiple terminals, and the URLLC service may be for high reliability and low latency, but the disclosure is not limited thereto. The services may be primary services in a wireless communication system such as an LTE system or a 5G or new radio/next radio (NR) system after the LTE system.

For convenience of descriptions, in the disclosure, terms and names or modifications of the terms and names defined in the $3^{rd}$ Generation Partnership Project Long Term Evolution (3GPP LTE) standard are used therein. However, the disclosure is not limited to these terms and names, and may be equally applied to wireless communication systems conforming to other standards. For example, although 5G (or NR) systems are mentioned as examples in the following description, embodiments of the disclosure may also be applied to other wireless communication systems having similar technical backgrounds or channel types. As another example, embodiments of the disclosure may be applied to a LTE or LTE-A system which is a wireless communication system before the NR system, and furthermore, embodiments of the disclosure may be applied to a wireless communication system to be developed after the NR system. Furthermore, embodiments of the disclosure may be applied to other wireless communication systems through partial modifications at the discretion of one of ordinary skill in the art without greatly departing from the scope of the disclosure.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

In the disclosure, a base station is an entity that allocates resources to a terminal, and may be at least one of a gNode B, an eNode B, a Node B, a base station (BS), a radio access unit, a BS controller, or a node on a network.

In the disclosure, a terminal may include a UE, a mobile station (MS), a cellular phone, a smartphone, a computer, or a multimedia system capable of performing a communication function.

In the disclosure, a cell may indicate an area covered by one BS in wireless communication. The cell may be classified into a mega cell, a macro cell, a micro cell, or a pico cell, based on a size of the cell, but these are merely an example and types of the cell are not limited thereto.

In the disclosure, a downward link or a downlink (DL) is a wireless transmission path of a signal transmitted from a BS to a UE, and an upward link or an uplink (UL) is a wireless transmission path of a signal transmitted from a UE to a BS. More particularly, as a representative example of the broadband wireless communication system, the LTE system has adopted an orthogonal frequency division multiplexing (OFDM) scheme in a DL and has adopted a single carrier frequency division multiple access (SC-FDMA) scheme in an UL. The UL refers to a radio link via which a UE (also referred to as a terminal) or an MS transmits data or a control signal to a BS (e.g., eNB), and the DL refers to a radio link via which a BS transmits data or a control signal to a UE.

In the disclosure, a controller may also be referred to as a processor.

In the disclosure, a layer (or a layer apparatus) may also be referred to as an entity.

FIG. 1 is a diagram for describing a structure of a centralized/cloud radio access network (cRAN).

Referring to FIG. 1, in the cRAN, a radio transceiver (also referred to as a radio unit (RU)) and a data processor (also referred to as a data unit (DU)) included in a legacy BS are now separate, and thus, a RU may be positioned in a BS 111 of a cell site and a DU may be positioned in a central server 121. A cell corresponds to an area covered by a BS in a wireless communication system, and at least one cell may exist for each BS. Unlike an integrated BS where both an RU and a DU exist in a cell site, in the cRAN, RUs may be positioned in BSs 111, 113, 115, 117, and 119 of the cell site, and DUs 121, 123, and 125 may be gathered to perform at least some functions among RAN functions. Descriptions of the RAN functions will be provided at a later time. The cRAN may collect and manage the DUs 121, 123, and 125, thereby easily adjusting interference between cells and providing a service including coordinated multi-point transmission and reception (CoMP) or the like.

The BSs 111, 113, 115, 117, and 119 of the cell site may include a radio frequency (RF) device or the like, and may transmit a signal to a data processor (e.g., the DU 121) via a fronthaul. The fronthaul indicates a network part that connects the BSs 111 and 113 of the cell site to a data processor (e.g., the DU 121), and may perform digital signal processing (DSP), power amplification, a filtering function, or the like.

A data processor (e.g., the DU 121) may process a signal received from a BS (e.g., the BS 111) of the cell site, and may transmit the processed signal to a core network device 130 via a backhaul. The core network device 130 may include devices that connect an end-to-end system consisting of a BS and a UE. For example, the core network device 130 may include a packet data network gateway (P-GW), a serving gateway (S-GW), a mobile management entity (MME), or the like. The P-GW may connect an internal node of a core network with external internet, may configure an Internet Protocol (IP) address to a UE, and may perform IP packet filtering. The S-GW may buffer a DL packet received from external internet, when radio resource control (RRC) connection is not configured with respect to the UE. The MME may process a control signal related to location registration, authentication, and calls of the UE. However, this is a merely an example, and a configuration of the core network device 130 is not limited to the aforementioned example.

A backhaul indicates a network part that connects a data processor (e.g., the DU 121) to the core network device 130 and may be implemented as a wired interface such as an optical fiber, but this is merely an example, and the backhaul may be implemented as a wireless network.

A data processor (e.g., the DU 121) may perform various RAN functions for processing signals. The RAN functions may include a packet data convergence protocol (PDCP) layer function, a radio link control (RLC) layer function, a medium access control (MAC) layer function, and a physical (PHY) layer function, but these are merely an example and thus, the RAN functions are not limited thereto. Hereinafter, functions of a PDCP layer, an RLC layer, a MAC layer, and a PHY layer will now be described.

The functions of the PDCP layer may include at least some functions among functions below.
  Header compression and decompression: robust header compression (ROHC) only
  Transfer of user data
  In-sequence delivery of upper layer protocol data units (PDUs)
  PDCP PDU reordering
  Duplicate detection of lower layer service data units (SDUs))
  Retransmission of PDCP SDUs
  Ciphering and deciphering
  Timer-based SDU discard in UL.

The reordering function of the PDCP layer may include at least one of a function of reordering PDCP PDUs received from a lower layer, on a PDCP sequence number (SN) basis, a function of delivering the reordered data to an upper layer in order, a function of recording missing PDCP PDUs by reordering the received PDCP PDUs, a function of reporting status information about the missing PDCP PDUs to a transmitter, or a function of requesting to retransmit the missing PDCP PDUs.

The functions of the RLC layer may include at least some functions among functions below.
  Transfer of upper layer PDUs
  In-sequence delivery of upper layer PDUs
  Out-of-sequence delivery of upper layer PDUs
  Error Correction through automatic repeat request (ARQ)
  Concatenation, segmentation and reassembly of RLC SDUs
  Re-segmentation of RLC data
  Reordering of RLC data
  Duplicate detection
  Protocol error detection
  RLC SDU discard
  RLC re-establishment The in-sequence delivery function of the RLC layer may include a function of delivering RLC SDUs received from a lower layer, to an upper layer in order, and a function of reassembling the RLC SDUs and delivering the reassembled RLC SDU when a plurality of RLC SDUs segmented from one RLC SDU are received. Also, the in-sequence delivery function may include a function of reordering received RLC PDUs on a RLC SN or PDCP SN basis, a function of recording missing RLC PDUs by reordering the received RLC PDUs, and a function of reporting status information about the missing RLC PDUs to a transmitter. Also, the in-sequence delivery function may include a function of requesting to retransmit the missing RLC PDUs, and a function of delivering only RLC SDUs prior to a missing RLC SDU, to an upper layer in order when the missing RLC SDU exists. Also, the in-sequence delivery function may include a function of delivering all RLC SDUs received before a timer starts, to an upper layer in order although a missing RLC SDU exists when a preset timer expires, or a function of delivering all RLC SDUs received so far, to an upper layer in order although a missing RLC SDU exists when a preset timer expires.

The RLC layer may process RLC PDUs in order of reception, regardless of SNs, and may deliver the RLC PDUs to the PDCP layer. When a segment is received, the RLC layer may assemble the segment with other segments stored in a buffer or to be subsequently received, into a whole RLC PDU and may deliver the RLC PDU to the PDCP layer. In a NR system, the RLC layer may not have a concatenation function, and the concatenation function may be performed by the MAC layer or may be replaced with a multiplexing function of the MAC layer.

The functions of the MAC layer may include at least some functions among functions below.
  Mapping between logical channels and transport channels
  Multiplexing/demultiplexing of MAC SDUs
  Scheduling information reporting
  Error correction through HARQ
  Priority handling between logical channels of one UE
  Priority handling between UEs by means of dynamic scheduling
  MBMS service identification
  Transport format selection
  Padding The PHY layer may perform at least some functions among functions below.
  Transmission and reception of data by using an electrical signal
  Channel coding/decoding function
  Modulation/demodulation function
  Power control
  Cell search The PHY layer may perform channel coding and modulation on data of an upper layer, may generate an OFDM symbol thereof, and may transmit the OFDM symbol via a wireless channel. Also, the PHY layer may perform demodulation and channel decoding on an OFDM symbol received via a wireless channel, and may deliver data obtained therefrom to an upper layer.

However, the aforementioned example is merely an example of the RAN functions, and the RAN functions may also include a function of an RRC layer. Examples of the function of the RRC layer are as below.
  Broadcasting of cell system information necessary for all terminals within a cell
  Management of delivery of a paging message
  Management (set/maintain/release) of RRC connection between a wireless terminal and E-UTRAN
  Transmission of UE context between eNodeBs in handover
  Setting, resetting, release of radio bearer
  UE measurement reporting and control thereof
  UE capability management: Temporarily apply cell ID to UE
  Security management including key management: RRC message ciphering, and the like ABS (e.g., the BS 111) of the cell site may be described by using terms such as a RU, a remote radio head (RRH), or the like, and a data processor (e.g., the DU 121) may be described by using terms such as a DU, a base band unit (BBU), or the like.

To collect and manage the DUs 121, 123, and 125 that perform the aforementioned RAN functions, it is necessary to provide a method of efficiently using physical resources necessary for data processing. To this end, the disclosure provides a method of performing, through virtualization, one or more RAN functions performed by the DUs 121, 123, and 125. The virtualization refers to a technology of extending a resource, which was usable by one device, by integrating and managing a plurality of physical resources. Hereinafter, with reference to FIGS. 2 and 3, examples of a virtualized RAN (vRAN) according to the disclosure will now be described.

Figure 2:
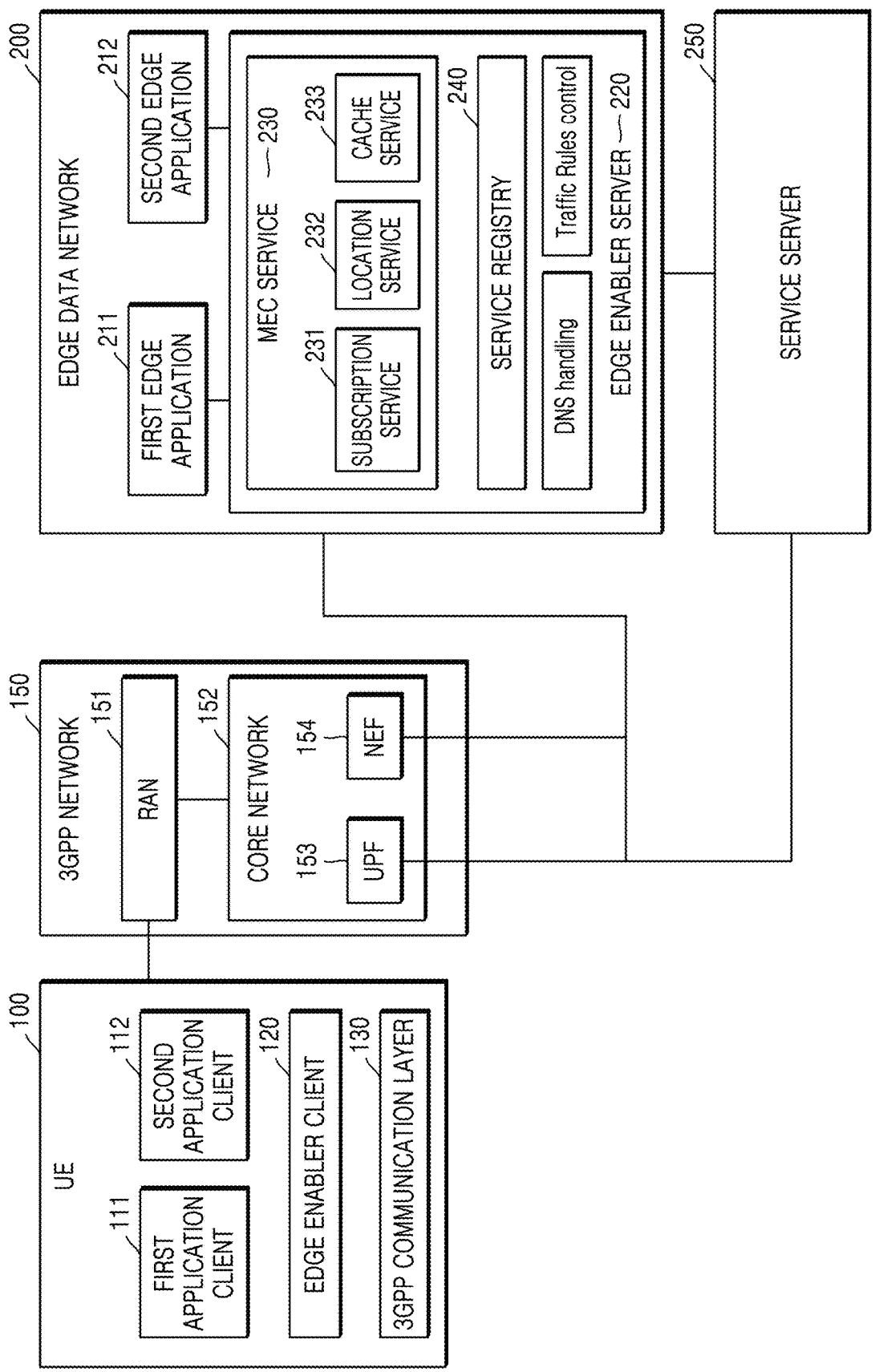
FIG. 2 is a diagram illustrating a network environment for supporting a mobile edge computing (MEC)-based service.

FIG. 2 is a diagram illustrating a network environment for supporting a mobile edge computing (MEC)-based service.

Referring to FIG. 2, the network environment may include a UE 100, a 3$^{rd}$ Generation Partnership Project (3GPP) network 150, an edge data network 200, and a service server 250. However, a configuration included in the network environment is not limited thereto.

According to an embodiment of the disclosure, each of components included in the network environment may indicate a physical entity unit or may indicate software or a module unit capable of performing an individual function. Therefore, each component included in the network environment may be referred to as an entity or a function.

According to an embodiment of the disclosure, the UE 100 may indicate a device used by a user. For example, the UE 100 may indicate a user terminal, a remote terminal, a wireless terminal, or a user device. Also, the UE 100 may include all types of a device.

According to an embodiment of the disclosure, the UE 100 may drive (or, execute) a plurality of application clients. For example, the UE 100 may include a first application client 111 and a second application client 112. The plurality of application clients may require different network services, based on at least one of a data rate of the UE 100, latency (or speed), reliability, the number of the terminals 100 accessing a network, a network access period of the UE 100, or an average data usage amount. The different network services may include, for example, an eMBB service, an URLLC service, or an mMTC service.

An application client of the UE 100 may indicate a default application previously installed in UE 100 or an application provided by a third party. That is, the application client of the UE 100 may indicate a client application program driven in the UE 100 for a particular application service. A plurality of application clients may be driven in the UE 100. At least one of the application clients may be used to provide an edge computing service from the edge data network 200 to the UE 100. For example, an application client may be an application installed and executed in the UE 100 and may provide a function of transmitting and receiving data via the edge data network 200. The application client in the UE 100 may refer to application software (or, a module) executed in the UE 100 to use a function provided by one or more particular edge applications.

According to an embodiment of the disclosure, a plurality of applications 111 and 112 in the UE 100 may perform data transmission and reception with the service server 250 based on a required network service type, or may perform data transmission and reception with the edge data network 200 based on edge computing. For example, when the first application client 111 does not require low latency, the first application client 111 may perform data transmission and reception with the service server 250. As another example, when the second application client 112 requires low latency, the second application client 112 may perform MEC-based data transmission and reception with the edge data network 200. However, the disclosure is not limited to the example, and the UE 100 may determine whether to transmit or receive data with the service server 250 or the edge data network 200, based on various conditions as well as latency.

According to an embodiment of the disclosure, an application client of the UE 100 may be referred to as a UE application (UE App), an application client, a client application (client App), or a UE application. Hereinafter, in the disclosure, for convenience of descriptions, an application client of the UE 100 will now be referred to as an application client.

According to an embodiment of the disclosure, the UE 100 may include an edge enabler client 120 and a 3GPP communication layer 130. According to an embodiment of the disclosure, the edge enabler client 120 may indicate a layer configured to perform an operation in the UE 100 so as to enable the UE 100 to use an edge computing service. According to an embodiment of the disclosure, the edge enabler client 120 may be referred to as an MEC enabling layer. The edge enabler client 120 may perform an operation of determining which UE App can use an edge computing service, and connecting the UE 100 with a network interface so as to enable data of the application client of the UE 100 to be transmitted to the edge data network 200 providing the edge computing service.

Also, the edge enabler client 120 and the 3GPP communication layer 130 may perform an operation of establishing data connection for enabling the UE 100 to use the edge computing service. The 3GPP communication layer 130 may indicate a layer performing a modem operation for using a mobile communication system, and may be configured to establish wireless connection for data communication, register the UE 100 to the mobile communication system, establish connection for data transmission in the mobile communication system, and transmit or receive data.

The UE 100 may be connected to the 3GPP network 150 and thus, may transmit or receive data related to the first application client 111 and the second application client 112.

According to an embodiment of the disclosure, the 3GPP network 150 refers to a wireless communication system complying with the standard rules of the 3GPP, and may be connected to the UE 100 and then may provide a wireless communication service to the UE 100. The 3GPP network 150 may include a $3^{rd}$ generation (3G) network, a LTE network, a LTE-A network, and a next-generation network (5G or NR). However, the disclosure is not limited to the example, and the 3GPP network 150 of the disclosure may include a network configured with a different communication technology.

According to an embodiment of the disclosure, the 3GPP network 150 may include a RAN 151 and a core network 152, and the core network 152 may include a user plane function (UPF) 153 and a network exposure function (NEF) 154. However, this is merely an example of a network function (NF) configuring the core network 152, and a configuration of the core network 152 is not limited to the aforementioned example.

According to an embodiment of the disclosure, the RAN 151 of the 3GPP network 150 refers to a network that is directly connected to the UE 100, and is an infrastructure providing a wireless access to the UE 100. The RAN 151 may include a plurality of BSs, and the plurality of BSs may perform communication through interfaces between the plurality of BSs. At least some interfaces between the plurality of BSs may be wired or wireless interfaces. ABS may be referred to as a gNode B, an eNode B, a Node B, a radio access unit, a BS controller, a node on a network, or other terms having equal technical meanings.

According to an embodiment of the disclosure, the core network 152 of the 3GPP network 150 may process data and control signals with respect to the UE 100 which are transmitted or received via the RAN 151. The core network 152 may perform various functions including control of a user plane and a control plane, processing of mobility, management of subscriber information, billing, interoperation with a different type of a system (e.g., the LTE system), and the like. In order to perform the various functions, the core network 152 may include a plurality of entities that have different NFs and are functionally separate.

For example, the core network 152 may include the UPF 153, an access and mobility management function (AMF) (not shown), a session management function (SMF) (not shown), a policy control function (PCF) (not shown), the NEF 154, a user data management (UDM) (not shown), a network data analysis function (NWDAF) (not shown), and a gateway mobile location center (GMLC) (not shown).

The 3GPP network 150 may be connected to the edge data network 200 and thus, may transmit or receive data related to an MEC service. Also, the UPF 153 may provide a data path (or, a data plane) between the UE 100 and the edge data network 200 or between the UE 100 and the service server 250. That is, the UPF 153 may serve as a gateway for delivering data (or, a data packet) transmitted or received to or from the UE 100.

The UE 100 and the edge data network 200 may transmit or receive data (or, a data packet) therebetween via the UPF 153. A data network (DN) may exist between the edge data network 200 and the UPF 153. The UPF 153 may be located close to the edge data network 200 so as to support the UE 100 with the edge computing service, and may deliver a data packet of the UE 100 to the edge data network 200 with low latency or deliver a data packet of the edge data network 200 to the UE 100 with low latency.

The UPF 153 may provide a data path between the UE 100 and the edge data network 200 by using a data network connected to the Internet. The UPF 153 may route a data packet to a DN between the service server 250 and the UE 100, the data packet intended be delivered to the Internet from among data packets transmitted from the UE 100.

A UPF in the 3GPP 5G network is a base configuration component of core infrastructure system architecture, and the 5G network can easily support an MEC service by dispersedly arranging UPFs to provide applications at various positions.

The UPF defined in the 3GPP provides functions below.

Interconnect point between a mobile infrastructure and a DN, i.e., encapsulation and decapsulation of a general packet radio service (GPRS) tunneling protocol for a user plane (GTP-U)

Protocol data unit (PDU) session anchor point for providing mobility within or between radio access technologies (RATs), including transmission of one or more end marker packets to a next generation node B (gNB)

Packet routing and forwarding, including performing the role of UL classifier/UL-CL (directing flows to specific DNs based on traffic matching filters) and a branching point, when acting as an immediate UPF (I-UPF) multi-homed to more than two PDU session anchors (PSAs)

Application detection using Service data flow (SDF) traffic filter templates or 3-tuple (protocol, server-side IP address and port number) packet flow description (PFD) received from SMF Per-flow QoS handling, including transport level packet marking for UL/DL, rate limiting and reflective QoS (DSCP) marking on DL.

Traffic usage reporting for billing and a lawful intercept (LI) collector interface The NEF 154 is an NF configured to expose, to the outside, capabilities and services of NFs of the 3GPP network 150. The NEF 154 may be connected to an external server (e.g., the edge data network 200), and thus may transmit information about an event occurring in an internal NF of the 3GPP network 150 or may transmit information about an event requested by the external server. The capabilities and services the NEF 154 exposes to the outside may include, for example, event reporting on a position of the UE 100, event reporting on a session of the UE 100, event reporting on mobility management of the UE 100, and the like. The external server may subscribe the capabilities and services exposed by the NEF 154 and thus may access the capabilities and services.

The edge data network 200 may provide an MEC service to the UE 100. To this end, the edge data network 200 may be placed in a BS of the 3GPP network 150 to which the UE 100 is connected or at a location geographically close to the BS, and may provide content whose part is equal to content provided by the service server 250. The edge data network 200 may be referred to as an MEC server, an MEC host, an edge computing server, a mobile edge host, an edge computing platform, and the like.

According to an embodiment of the disclosure, the edge data network 200 may include a plurality of edge applications and may execute (or, drive) the edge applications. For example, the edge data network 200 may include a plurality of edge applications (a first edge application 211 and a second edge application 212), and an edge enabler server 220. However, these are merely an example, and a configuration of the edge data network 200 is not limited thereto.

According to an embodiment of the disclosure, an edge application may indicate an application provided by a third party in the edge data network 200 which provides an edge computing service, and may establish a data session with an application client so as to transmit or receive data related to the application client. The data session may indicate a communication path established by the application client of the UE 100 and the edge application of the edge data network 200 so as to transmit or receive data.

According to an embodiment of the disclosure, the edge data network 200 may provide a virtual resource to the edge application. For example, the virtual resource may include at least one of a computing resource, a storage resource, or a network resource (e.g., a network bandwidth), which is usable by the edge application. The edge application of the edge data network 200 may be executed (or, driven) by using a virtual machine.

According to an embodiment of the disclosure, the application of the edge data network 200 may be referred to as an edge application, an MEC App, an edge application server, an ME(MEC) App, and the like. Hereinafter, in the disclosure, for convenience of descriptions, the application of the edge data network 200 will now be referred to as an edge application.

According to an embodiment of the disclosure, the edge data network 200 may include the edge enabler server 220. The edge enabler server 220 may be referred to as a mobile edge computing (MEC) platform, a mobile edge (ME) platform (MEP), a platform, and the like.

According to an embodiment of the disclosure, the edge enabler server 220 may provide a function requested in executing the edge application. For example, the edge enabler server 220 may provide a function or an environment in which the edge application can provide an MEC service to the UE 100 or the like or the edge application can consume an MEC service. Also, the edge enabler server 220 may perform traffic control or may perform Domain Name System (DNS) handling.

Hereinafter, an MEC service may indicate a service the edge data network 200 or the edge application provides to the UE 100 or a service usable by the edge application.

According to an embodiment of the disclosure, an edge computing service may collectively refer to services related to procedures and information requested to use the edge application. The edge computing service may be provided or consumed by the edge enabler server 220 or the edge application. For example, the edge application may provide an edge computing service to the UE 100, or may use an edge computing service provided by the edge enabler server 220 so as to provide an edge computing service to the UE 100. Also, the edge enabler server 220 may provide the edge application with an edge computing service that is usable by the edge application to provide an edge computing service to the UE 100. Hereinafter, an edge computing service may indicate a service the edge data network 200 or the edge application provides to the UE 100 or may indicate a service that is provided by the edge enabler server 220 and is usable by the edge application.

According to an embodiment of the disclosure, the edge enabler server 220 may provide an edge computing service to the edge application. For example, the edge enabler server 220 may provide various information (data, contents or the like, for example, information about a location of a UE, caching data, information about a subscribed service or the like) to the edge application, according to a provided edge computing service. The edge application may provide an edge computing service to the UE 100 by using an edge computing service provided by the edge enabler server 220. For example, the edge application may provide an edge computing service to the UE 100, based on a plurality of pieces of information provided as an edge computing service by the edge enabler server 220. The edge computing service provided to the UE 100 may be a service requested for the UE 100 to drive an application client (e.g., provision of data requested to run the application client). Hereinafter, provision of an edge computing service from the edge data network 200 to the UE 100 may indicate that the edge application of the edge data network 200 provides an edge computing service requested for the UE 100 to drive the application client.

The edge enabler server 220 may include an MEC service 230 and a service registry 240. The MEC service 230 may provide an edge computing service to edge applications included in the edge data network 200. The MEC service 230 may be implemented as software or a module which can perform an individual function. The service registry 240 may provide information about a service available in the edge data network 200.

According to an embodiment of the disclosure, when an instance of an edge application is instantiated, the edge enabler server 220 may internally register the edge application. The edge enabler server 220 may register the edge application and may store information related to the edge application. The information related to the edge application which is stored in the edge enabler server 220 may include information about an edge computing service to be provided from the edge application to the UE 100 or the like, information indicating whether the edge computing service is a required service or an optional service for the edge application, and the like.

According to an embodiment of the disclosure, the edge application may register a new edge computing service in the edge enabler server 220, may update a pre-registered edge computing service, or may retrieve an edge computing service registered in the edge enabler server 220. When the edge application registers or updates an edge computing service to the edge enabler server 220, the edge application may provide the edge enabler server 220 with information about the edge computing service to be registered or updated. The edge enabler server 220 may register the edge computing service in the service registry 240.

According to an embodiment of the disclosure, the edge enabler server 220 may transmit information about edge computing services registered in the service registry 240 to an edge application in the edge data network 200. For example, the edge enabler server 220 may transmit, to the edge application, a list of the edge computing services registered in the service registry 240. Also, the edge enabler server 220 may transmit, to the edge application, information about availability of edge computing services registered or newly registered in the service registry 240.

According to an embodiment of the disclosure, the edge application may subscribe the MEC service 230 registered in the service registry 240. The edge application may transmit subscription request information about an edge computing service to the edge enabler server 220, and thus, may subscribe the edge computing service. The subscription of the MEC service 230 by the edge application may indicate that the edge application is continuously provided the MEC service 230 or information about the MEC service 230 from the edge enabler server 220. By subscribing the MEC service 230 registered in the service registry 240, the edge application may use the MEC service 230 when provided from the edge enabler server 220, and may provide the MEC service 230 to the UE 100.

According to an embodiment of the disclosure, the MEC service 230 may provide various services to the edge application. For example, the MEC service 230 may provide, to the edge application, a subscription service 231, a location service 232, a cache service 233, and the like.

The subscription service 231 may provide information about an event to the 3GPP network 150 or may be provided information about the event from the 3GPP network 150. The event may include an event about a change in traffic or service usage by a UE, an event related to a location of the UE (e.g., a current location of the UE, a change in a location, a location of the UE in a particular situation, and the like), disconnection with respect to the UE, an access by the UE, a roaming state of the UE, a communication failure, or the like.

The location service 232 may provide information about a location of the UE 100, a service based on the information about the location of the UE 100, and the like. The location service 232 may obtain the information about the location of the UE 100 via the 3GPP network 150. The information about the location of the UE 100 may include Global Positioning System (GPS) information of the UE 100, information about an area where the UE 100 is located, information about a route on which the UE 100 moves, information about a cell to which the UE 100 is connected (or camped on), information about a cell to which the UE 100 is to be handed over, and the like. The information about the location of the UE 100 is not limited to the example and may include all information related to the location of the UE 100.

The cache service 233 may cache data from the service server 250 and may provide the data. Caching may indicate a technology of pre-obtaining data from a data provision server before occurrence of a data request and storing the data, thereby providing the data with low latency, in response to the data request. In the disclosure, caching may refer to a series of processes in which, before a request by the UE 100 or the application client occurs, data to be provided by the service server 250 is requested to the service server 250 and is pre-stored. The edge data network 200 may pre-store, through caching, data to be provided to the UE 100 in the edge data network 200 located closer than the service server 250, and thus, may decrease a network transmission delay.

The service server 250 may provide content related to an application (e.g., an application client, an edge application, etc.) of the UE 100. The edge data network 200 may transmit or receive data to or from the service server 250 so as to provide an MEC service, and may previously cache data from the service server 250.

According to an embodiment of the disclosure, the UE 100 may transmit or receive data to or from the service server 250, based on a network service type requested by the plurality of application clients (e.g., the first application client 111 and the second application client 112). The service server 250 may provide a service or data required for the UE 100 to drive (or, execute) an application client, and may provide the edge data network 200 with an edge application capable of providing an edge computing service to the application client of the UE 100. Also, the service server 250 may provide the edge data network 200 with a service or data required for the UE 100 to drive (or, execute) the application client.

The service server 250 may be operated or managed by a content provider providing content to the UE 100.

Figure 3:
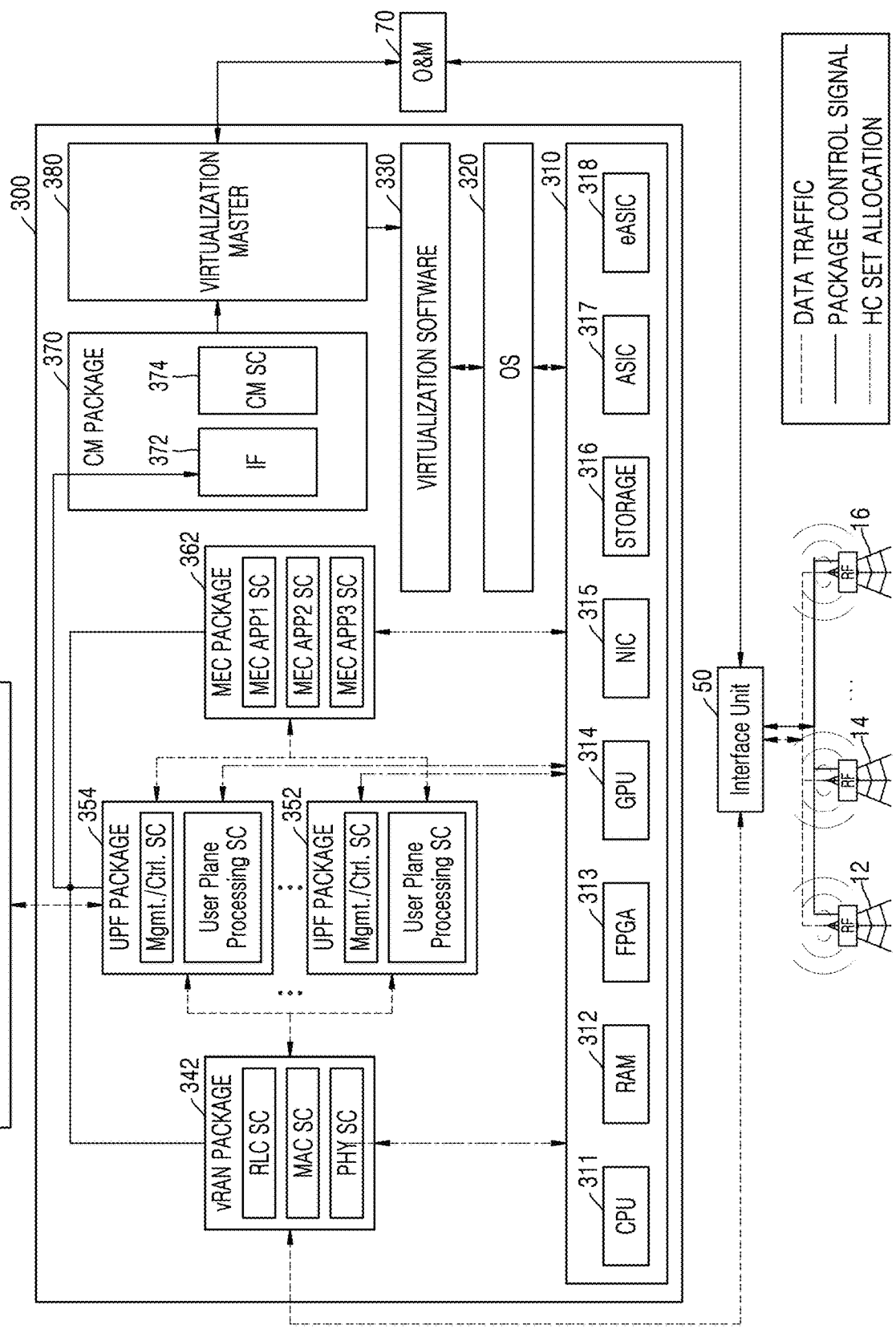
FIG. 3 is a block diagram of a system for executing a software package according to an embodiment of the disclosure.

FIG. 3 is a block diagram of a system for executing a software package according to an embodiment of the disclosure.

The software package refers to a set of software components (SCs) capable of performing functions implemented as hardware, and may include a vRAN package, an MEC package, and a UPF package.

A SC is a physical binary file obtained by modulizing a frequently-used function, and in other words, the SC indicates a unit to be re-used as a capsulized software part. The SC may be stored as an application with an executable file (e.g., when generated by C code) or with code (e.g., when generated by Python) in a storage such as a hard disk drive (HDD), a solid-state drive (SDD), or the like, and may operate.

The software package may indicate a container for grouping unified modeling language (UML) elements with a relation into one group, and may be managed as one application of a set of at least one SC.

Referring to FIG. 3, a system that executes the software package may include a server 300, an operations and maintenance (O & M) 70, an interface unit 50, an external server 90, and a plurality of BSs 12, 14, and 16. Traffic flows of user plane data and control plane data for using each package are marked using a dotted line, flows of control signals for executing a software package according to an embodiment of the disclosure are marked using a full line, and hardware components allocated to each software package so as to process a task operated in each software package are marked using a separate dotted line.

The task operated in each package is a task performed by a SC of each package, and may indicate a procedure of generating output data by processing input data according to preset code.

The server 300 may include hardware 310, an operating system (OS) 320, virtualization software 330, packages 342, 352, 354, and 362 (also referred to as the vRAN package 342, the UPF package 352, the UPF package 354, and the MEC package 362) to perform NFs, a component management (CM) package 370, and a virtualization master 380.

The server 300 may be connected to the plurality of BSs 12, 14, and 16 of a cell site via the interface unit 50, and the O & M 70 may command the interface unit 50 to allocate traffic to each package, the traffic occurring in the plurality of BSs 12, 14, and 16.

The server 300 may include the hardware 310 to drive software for executing a function of each software package. The hardware 310 may include a central processing unit (CPU) 311, a random access memory (RAM) 312, a field programmable gate array (FPGA) 313, a graphics processing unit (GPU) 314, a network interface controller (NIC) 315, a storage 316, an application-specific integrated circuit (ASIC) 317, and an eASIC 318, but this is merely an example, and components of the hardware 310 are not limited thereto.

The CPU 311 and the GPU 314 are processors having a general purpose, and their performances are determined based on a value of clocks (operation rate), the number of cores (core circuits), and a capacity of cache memory.

The CPU 311 is advantageous to rapidly process a single task when the value of clocks is high, and is advantageous to perform multiple tasks or drive a program optimized for multi-core computation when the number of cores is high. In a case where the cache memory is large, it is possible to increase operation efficiency when a program requiring a large load is driven or a frequently-performed operation is repeatedly processed. The CPU 311 has a structure specialized for a serial (sequential) processing scheme for processing data in an order of instructions are input, and is designed to rapidly perform a simple operation using a large volume of fixed point data.

The GPU 314 was developed to process complicated three-dimensional (3D) graphics through a parallel-computation specified structure, but, recently, a general purpose computing on graphics processing unit (GPGPU) technology is used in which a processing capability of a GPU is used not only in processing graphics but also in a general operation.

A parallel processing function of the GPU 314 may be applied to deep learning. In a case where a large volume of vector data is computed and computations of each row and each column are parallel processed, the computations are faster than serial processing using a CPU such that technologies of using a GPU in deep learning are being developed. However, processing using a CPU may be faster, depending on an implementation method, such that it is necessary to appropriately combine processing schemes by the CPU and the GPU. The FPGA 313, the ASIC 317, and the eASIC 318 are semiconductors specialized for particular functions or purposes.

The FPGA 313 indicates a logic circuit-type semiconductor to be freely configured by a semiconductor designer according to designer's intention. An FPGA has advantages in which the FPGA has flexibility so that, when a design factor is changed during usage, a new logic circuit can be re-input to the FPGA, and a commercialization procedure from a design to production is short. The FPGA may include an ARM core or a hard logic block such as a transmission and reception module for off-chip communication.

The ASIC 317 is generally called a customized semiconductor, and indicates a semiconductor to be programmed for a particular use according to a user order. A design of an ASIC is highly optimized because there is no die area for additional logic. Compared to the FPGA, the ASIC has a relatively low price but a production lead time is rather long.

The eASIC 318 is a structured semiconductor of an intermediary technology between the FPGA and a standard-cell ASIC. The eASIC 318 is fixed designed such as the ASIC and thus is faster than the FPGA being variably designed, and has a power-saving effect such as the ASIC because the eASIC 318 does not have a die area. As a result thereof, the eASIC 318 has a lower price and lower power consumption than the FPGA, and has a shorter production lead time and lower non-recurring engineering costs than the standard-cell ASIC.

The hardware 310 of FIG. 3 includes all of the FPGA 313, the ASIC 317, and the eASIC 318, but is not limited thereto. According to a particular embodiment, the hardware 310 may include only some of them.

The NIC 315 indicates a hardware device used for connection to a network for communication.

The RAM 312 is a form of memory that can be randomly read and changed, and is generally used to store working data and code. The RAM 312 allows data to be read or written in almost the same amount of time irrespective of the physical location of the data inside the memory.

The storage 316 is a storage medium enabled to record information (data) and refers to a physical medium including digital information. Also, the storage 316 may include a HDD, an SDD, and the like.

In the hardware 310, one OS 320 may operate. The OS 320 may manage software (e.g., the virtualization software 330) that is executed in the hardware 310 and the server 300. The virtualization software 330 may logically divide a resource managed by the OS 320, and may allow a plurality of SCs to share the logically divided resource. The resource indicates an item used for the vRAN package 342 to process traffic. For example, the resource may include the CPU 311, the RAM 312, the FPGA 313, the GPU 314, and the like, but these are merely an example, and thus, the resource is not limited thereto.

The logical division of the resource may be performed by distributing, through a switch, a physical communication line connecting the resource to the plurality of SCs. A SC indicates a component to be used as a separate server by collecting libraries or applications that are required to perform a particular function, and may be generated or removed in a unit of a package. The package is a minimum unit that shares one IP and may include one or more SCs. An example of the virtualization software 330 may include Kubernetes, and the SC may correspond to a container of the Kubernetes.

According to an embodiment of the disclosure, the SC may be used to perform an NF. The NF according to an embodiment of the disclosure may refer to a function of forwarding traffic back and forth between devices existing over a network, and processing occurred traffic, and may include a RAN function, a UPF, and an MEC function. The RAN function may correspond to a RAN function described above with reference to FIG. 1, and the MEC function may correspond to an edge data network function described above with reference to FIG. 2. Also, as described above, the UPF serves as a gateway for delivering data transmitted or received to or from a UE, by providing a data path (or, a data plane) between the UE and an edge data network or between the UE and a service server.

In the disclosure, a configuration component of hardware in which a package including a SC for virtualizing an NF is executed will now be referred to as a hardware component (HC).

The server 300 according to an embodiment of the disclosure may determine at least one HC in which a package including a SC for virtualizing a NF is executed. Also, the server 300 may determine whether to perform offloading for changing a HC allocated to the package to a different HC, the package including the SC for virtualizing the NF, and may perform offloading.

The offloading indicates an operation of migrating a processing point of the NF so as to allow the package having been executed in a particular HC to be executed in the different HC, and when offloading is performed, a function of the package which has been performed in a previously-allocated HC is now performed in a newly-allocated HC.

For example, the server 300 may migrate the vRAN function, the UPF, and the MEC function, which are previously processed by using a HC such as the CPU 311, the RAM 312, the storage 316, or the GPU 314, to a different HC such as the GPU 314, the FPGA 314, or the like and may process them. As another example, the server 300 may change a HC where each package is executed, based on vRAN package usage information, UPF package usage information, MEC package usage information, and the like.

A procedure of changing the HC where each package is executed may include scale-out and scale-in.

The scale-out indicates a function of extending a resource instance by adding allocated to the SC for virtualizing the NF, and the scale-in indicates a function of removing a resource instance allocated to the SC for virtualizing the NF. Scale-up/down indicates a function of changing a resource instance allocated to the SC for virtualizing the NF For example, when the server 300 determines hardware offloading of changing a HC to execute an MEC package from a CPU to a GPU, the server 300 may generate a new MEC package by scaling-out instances equal to a SC included in the MEC package. When the new MEC package is generated, the server 300 may allocate the GPU to the new MEC package, may change a path of data traffic to the new MEC package, and may delete the old MEC package by removing instances by scaling-in the instances of the SC included in the MEC package.

By using a hardware virtualization technology, a plurality of virtual machines (e.g., a software package) may share one physical hardware embedded in a server. As the GPU has multiple cores as described above, the GPU is advantageous in parallel processing and has a low price per unit core, compared to the CPU. Therefore, the GPU is advantageous to be used as a resource for cloud computing (MEC), but, the cloud computing is a technology based on virtualization and thus, the GPU has to be virtualized to be used as a complete cloud resource.

When a multi-core processor with a general-purpose CPU core having powerful performance is combined with an architecture of the GPU that is simple but has multiple cores, the combination may be more appropriate to process high performance computing (HPC). A heterogeneous system where the multi-core processor (the CPU) and the GPU are combined has all of a control-integrated component and a high-level data parallel component, and thus, may satisfy various requirements of HPC application programs.

When a hardware resource is virtualized, a preset percentage (or computation) of each hardware resource may be used to process a task of a particular software package. When a hardware resource optimized for necessity of each package is allocated by using such feature, a system resource may be further efficiently used, system scalability may be increased, and operation costs may be reduced.

For example, it is assumed a case in which the CPU has N cores and the GPU has M cores. While the MEC package 362 uses N/2 of all cores of a CPU, when the server 300 determines hardware offloading of changing a HC having executed the MEC package 362 to N/4 of the cores of the CPU and M/2 of cores of a GPU, the server 300 may generate a new MEC package (not shown) by scaling-out instances equal to a SC included in the MEC package 362. When the new MEC package is generated, the server 300 may allocate N/4 of the cores of the CPU and M/2 of the cores of the GPU to the new MEC package, may change a path of data traffic to the new MEC package, and may delete the old MEC package 362 by removing instances by scaling-in the instances of the SC included in the old MEC package 362.

As such, a set of HCs may be allocated to one software package. The set of HCs allocated to one software package may be determined based on use or non-use and a usage amount of each of a plurality of HCs (e.g., the HCs 311 to 318), and allocation of the new set of HCs may include a case in which a plurality of items of hardware configuring the set of HCs are equal but only a usage amount is changed.

In the disclosure, all operations described above may be included in a range of offloading. Hereinafter, offloading operations of the server 300 will now be described in detail.

The server 300 may be connected to the plurality of BSs 12, 14, and 16 of a cell site via the interface unit 50. The interface unit 50 is a portion of a path connecting the server 300 to the plurality of BSs 12, 14, and 16 of the cell site, and for example, traffic of a BS may be forwarded to the vRAN package 342 via the interface unit 50. Also, as another example, information about an allocated vRAN package (e.g., the vRAN package 342) may be delivered to the plurality of BSs 12, 14, and 16 of the cell site via the interface unit 50. The interface unit 50 may include an Ethernet interface unit (EIU) or a front switching unit (FSU).

The server 300 according to an embodiment of the disclosure may perform at least some of RAN functions used to be performed by a BS. The RAN functions may include, for example, a PDCP layer function, an RLC layer function, a MAC layer function, and a PHY layer function, but these are merely an example and thus, the RAN functions are not limited thereto.

Accordingly, a radio transceiver including a RF device may exist in each of the plurality of BSs 12, 14, and 16 of the cell site, and the RAN functions except for functions performed by the plurality of BSs 12, 14, and 16 may be performed by the server 300. For example, a PHY SC, a MAC SC, and an RLC SC may be generated in the server 300, and the PHY SC, the MAC SC, and the RLC SC may respectively perform the PHY layer function, the MAC layer function, and the RLC layer function. However, these are merely an example, and RAN functions performed by the server 300 are not limited thereto.

According to an embodiment of the disclosure, the PHY SC, the MAC SC, and the RLC SC may be included in one vRAN package (e.g., the vRAN package 342). The vRAN package 342 is a minimum unit that may include one or more SCs, each performing a RAN function. The vRAN package 342 may be configured with instructions allowing RAN functions to be virtualized and then performed, the RAN functions being used to be performed by a hardware device according to the related art, and an SC may be removed or generated in a unit of the vRAN package 342.

The vRAN package 342 may provide vRAN package usage information to the CM package 370. The vRAN package usage information may include traffic information and traffic processing information about traffic occurring in the plurality of BSs 12, 14, and 16. Here, the traffic refers to a data flow passing through a communication network in a predefined time. According to an embodiment of the disclosure, the traffic may include a data flow between a UE and a BS (e.g., the BS 12), and may be indicated as a data rate per unit time.

The traffic may occur in a procedure in which a UE accessed a BS (e.g., the BS 12) executes an application. The application indicates an application program driven for a particular application service in a device such as a UE, and a plurality of applications may be driven in the UE. At least one of the applications may use an MEC service.

vRAN traffic information refers to information capable of directly or indirectly indicating an amount and a characteristic of traffic. The vRAN traffic information may include information about the number of cells processed by a vRAN package, a traffic processing speed (e.g., bps) per cell, the number of UEs connected to a BS, a bandwidth allocated to the BS, a spectrum sharing ratio between different wireless communication technologies, DL and UL processing times (DL/UL latency), the number of layers according to multiple-input and multiple-output (MIMO) antenna of each BS, a resource usage amount (e.g., a percentage of physical resource block (PRB) usage) by each BS, the frequency of handover of a UE, or the like. As another example, the vRAN traffic information may include a type of a service causing the traffic, a frequency band in which the traffic occurs, a type of a wireless communication system (e.g., an NR or an LTE) in which the traffic occurs, or the like.

Also, vRAN traffic processing information refers to information about a procedure of processing traffic, according to a RAN function. For example, the vRAN traffic processing information may include vRAN resource information used in processing traffic occurring in a plurality of BSs.

The vRAN resource information may directly or indirectly indicate a hardware resource used in processing vRAN traffic. The vRAN resource information may include a type of hardware allocated to a vRAN package, a ratio of a hardware core used in processing the vRAN traffic to hardware cores allocated to the vRAN package, the number of clock cycles used in processing the vRAN traffic compared to a maximum hardware core clock cycle, a size of a memory allocated to the vRAN package so as to process the vRAN traffic, or the like. Also, the vRAN resource information may include information about HCs usable by a vRAN package, and in this regard, the information about the HCs usable by the vRAN package may include priority information about each of the HCs.

However, this is merely an example, and examples of the vRAN traffic information or the vRAN resource information are not limited thereto.

The vRAN package usage information may be received by the vRAN package 342 via the interface unit 50 from the plurality of BSs 12, 14, and 16, and according to another embodiment of the disclosure, the vRAN package usage information may be received from the OS 320 in the server 300 or another external device. For example, the traffic information in the vRAN package usage information may be received from the plurality of BSs 12, 14, and 16. Also, resource information in the vRAN package usage information may be received from the OS 320 in the server 300. However, this is merely an example, and a method, performed by the vRAN package 342, of receiving the vRAN package usage information is not limited thereto. As another example, the vRAN package usage information may be obtained as a result of applying, by the vRAN package 342, a statistics method (e.g., a calculation method such as an average, variance, or the like) to pre-obtained vRAN package usage information.

The vRAN package 342 may deliver the obtained vRAN package usage information to the CM package 370. The CM package 370 will be described below.

The vRAN package 342 may forward, to the MEC package 362 via the UPF package 352 or 354, traffic that occurs due to execution of an application using an MEC service from among forwarded traffic.

The server 300 according to an embodiment of the disclosure may perform at least some of UPFs used to be performed by a core network. The UPFs may include a management/control function and a user plane processing function, and a management/control SC and a user plane processing SC may be generated in the server 300 so as to respectively perform the aforementioned functions. However, these are merely an example, and thus, the UPFs performed by the server 300 are not limited thereto.

According to an embodiment of the disclosure, the management/control SC and the user plane processing SC may be included in one UPF package (e.g., the UPF package 352 or 354). Here, user plane data transmitted from the vRAN package 342 may be processed by the UPF packages 352 and 354 and then may be transmitted to the MEC package 362.

The UPF package 352 or 354 may provide UPF package usage information to the CM package 370. The UPF package usage information may refer to information about processing of user plane data transmitted from the vRAN package 342 or the MEC package 362, and may include information about the number of UEs/sessions connected to a vRAN package, a UPF traffic processing rate (e.g., a packet per second), or the like.

The UPF package usage information may include, for example, UPF resource information used in processing the user plane data.

The UPF resource information may directly or indirectly indicate a hardware resource used in processing the user plane data, and for example, may include a type of hardware allocated to a UPF package, a ratio of a hardware core used in processing traffic to hardware cores allocated to the UPF package, the number of clock cycles used in processing the traffic compared to a maximum hardware core clock cycle, a size of a memory allocated to the UPF package so as to process the traffic, or the like. Also, the UPF resource information may include information about HCs usable by a UPF package, and in this regard, the information about the HCs usable by the UPF package may include priority information about each of the HCs.

However, these are merely an example, and examples of the UPF package usage information or the UPF resource information are not limited thereto.

The UPF package usage information may be received from the OS 320 in the server 300 or another external device. For example, user plane traffic information in the UPF package usage information may be received from the vRAN package 342. Also, resource information in the UPF package usage information may be received from the OS 320 in the server 300. However, this is merely an example, and a method, performed by the UPF package 352 or 354, of receiving the UPF package usage information is not limited thereto. As another example, the UPF package usage information may be obtained as a result of applying, by the UPF package 352 or 354, a statistics method (e.g., a calculation method such as an average, variance, or the like) to pre-obtained UPF package usage information.

The UPF package 352 or 354 may deliver the obtained UPF package usage information to the CM package 370.

The MEC package 362 may execute an edge application, and may process traffic occurrence due to execution of the edge application or traffic received in relation to the edge application. The edge application may be executed on an edge data network, and the edge data network may be placed in a BS of a 3GPP network to which a UE is connected or at a location geographically close to the BS, and may provide content whose part is equal to content provided by the external server 90. Traffic that does not use an MEC service from among the traffic forwarded to the vRAN package 342 may be forwarded to another server outside the server 300, and the disclosure does not provide descriptions of a method by which the other server outside the server 300 processes traffic.

The MEC package 362 may provide the MEC package usage information to the CM package 370. The MEC package usage information may indicate information about services provided via edge applications, and may include information about the number of the edge applications, the number of UEs connected to the edge applications, response times of the edge applications, types of the services, time periods of using the services, an amount of traffic occurrence due to usage of the services, locations of the UEs using the services, or the like.

The MEC package usage information may include, for example, MEC resource information used in processing edge application data.

The MEC resource information may refer to information capable of directly or indirectly indicating a hardware resource used in processing the edge application data, and may include a type of hardware allocated to an MEC package, a ratio of a hardware core used in processing traffic to hardware cores allocated to the MEC package, the number of clock cycles used in processing the traffic compared to a maximum hardware core clock cycle, a size of a memory allocated to the MEC package so as to process the traffic, or the like. Also, the MEC resource information may include information about HCs usable by the MEC package, and in this regard, the information about the HCs usable by the MEC package may include priority information about each of the HCs.

However, this is merely an example, and examples of the MEC package usage information or the MEC resource information are not limited thereto.

The MEC package usage information may be received from the OS 320 in the server 300 or another external device. Also, resource information in the MEC package usage information may be received from the OS 320 in the server 300. However, this is merely an example, and a method, performed by the MEC package 362, of receiving the MEC package usage information is not limited thereto. As another example, the MEC package usage information may be obtained as a result of applying, by the MEC package 362, a statistics method (e.g., a calculation method such as an average, variance, or the like) to pre-obtained MEC package usage information.

The MEC package 362 may deliver the obtained MEC package usage information to the CM package 370.

The CM package 370 refers to a set of instructions for determining the number of SCs included in the vRAN package 342, the UPF package 352 or 354, or the MEC package 362 and a resource allocated to an SC or a HC performing an MEC function or a vRAN function. The CM package 370 may include an interface (IF) 372 and a component management SC (CM SC) 374. The IF 372 may receive the vRAN package usage information from the vRAN package 342, may receive the UPF package usage information from the UPF package 352 or 354, and may receive the MEC package usage information from the MEC package 362. As another example, the IF 372 may obtain, from an external device, information about an event predicted to cause a change in package usage.

The CM package 370 may obtain hardware usage information about all packages included in the server 300. The hardware usage information may include, for example, information about an allocation state with respect to a package, use or non-use, a core load state, the number of processing cycles per core, or the like about each of HCs including the CPU 311, the RAM 312, the FPGA 313, the GPU 314, the NIC 315, the storage 316, the ASIC 317, and the eASIC 318.

The CM SC 374 may determine at least one HC to execute a software package in the server 300, based on the vRAN package usage information, the UPF package usage information, the MEC package usage information, and the hardware usage information.

For example, as a result of determination based on the MEC package usage information, when the CM SC 374 determines that an MEC service usage amount is increased, the CM SC 374 may offload processing of traffic occurring in the MEC service, which was performed by a CPU, to a GPU and a FPGA so as to increase a processing speed of the MEC service. As the GPU and the FPGA are all used to process the MEC service, the CM SC 374 may determine a vRAN function to be performed by the CPU.

In another example, as a result of determination based on the vRAN package usage information, when a bottleneck in data transmission occurs or occurrence of the bottleneck is predicted due to an increase in LDCP decoding computations by a low density parity check (LDPC) decoder of a PHY SC included in the vRAN package 342, the CM SC 374 may determine to offload the CPU 311 that is a HC allocated to the vRAN package 342, and may determine the GPU 314 as an optimal HC to be allocated. LDPC refers to an error correcting code having high code correcting performance, and repeatedly computes an algorithm of correcting an error by exchanging a message. When a size of H-matrix that is a parity check matrix is sharply increased, stability of high-speed data transmission cannot be guaranteed due to an increase in computations of a decoding procedure, such that an LDPC processing speed may be increased by parallel processing the LDPC decoder by using a GPU.

As another example, as a result of determination based on the MEC package usage information and the vRAN package usage information, when both the MEC package 362 and the vRAN package 342 require high-capacity processing, the CM SC 374 may determine the GPU 314 to be allocated to the MEC package 362 and determine the FPGA 313 to be allocated to the vRAN package 342. Alternatively, the CM SC 374 may determine a CPU core and a GPU core to be allocated to each of the MEC package 362 and the vRAN package 342 at a preset percentage Here, the percentage of the CPU core and the GPU core to be allocated to each of the MEC package 362 and the vRAN package 342 may be determined to be an optimal percentage based on the MEC package usage information and the vRAN package usage information. For convenience of descriptions, the descriptions are provided with reference to the CPU 311 and the GPU 314, but a HC set to be used by a software package may further include the storage 316, the RAM 312, and the like, in addition thereto.

The CM SC 374 may deliver determined information about the vRAN package and the MEC package to the virtualization master 380, and the virtualization master 380 may transmit, according to a delivered instruction, a command to adjust the vRAN package and the MEC package to the virtualization software 330.

However, this is merely an example, and the CM SC 374 may determine the number of SCs in software to perform an NF, a type of a HC to execute a resource and the software, and the like, based on an amount of traffic predicted to occur, a type of the traffic, traffic processing requirement performance, and the like. Detailed descriptions thereof will be provided below with reference to FIG. 4.

In consideration of the adjusted vRAN package, the O & M 70 may command the interface unit 50 to allocate traffic occurring in the plurality of BSs 12, 14, and 16 to each of the adjusted vRAN package. Accordingly, traffic received from at least one of the plurality of BSs 12, 14, and 16 may be newly allocated to the adjusted vRAN package.

Figure 4:
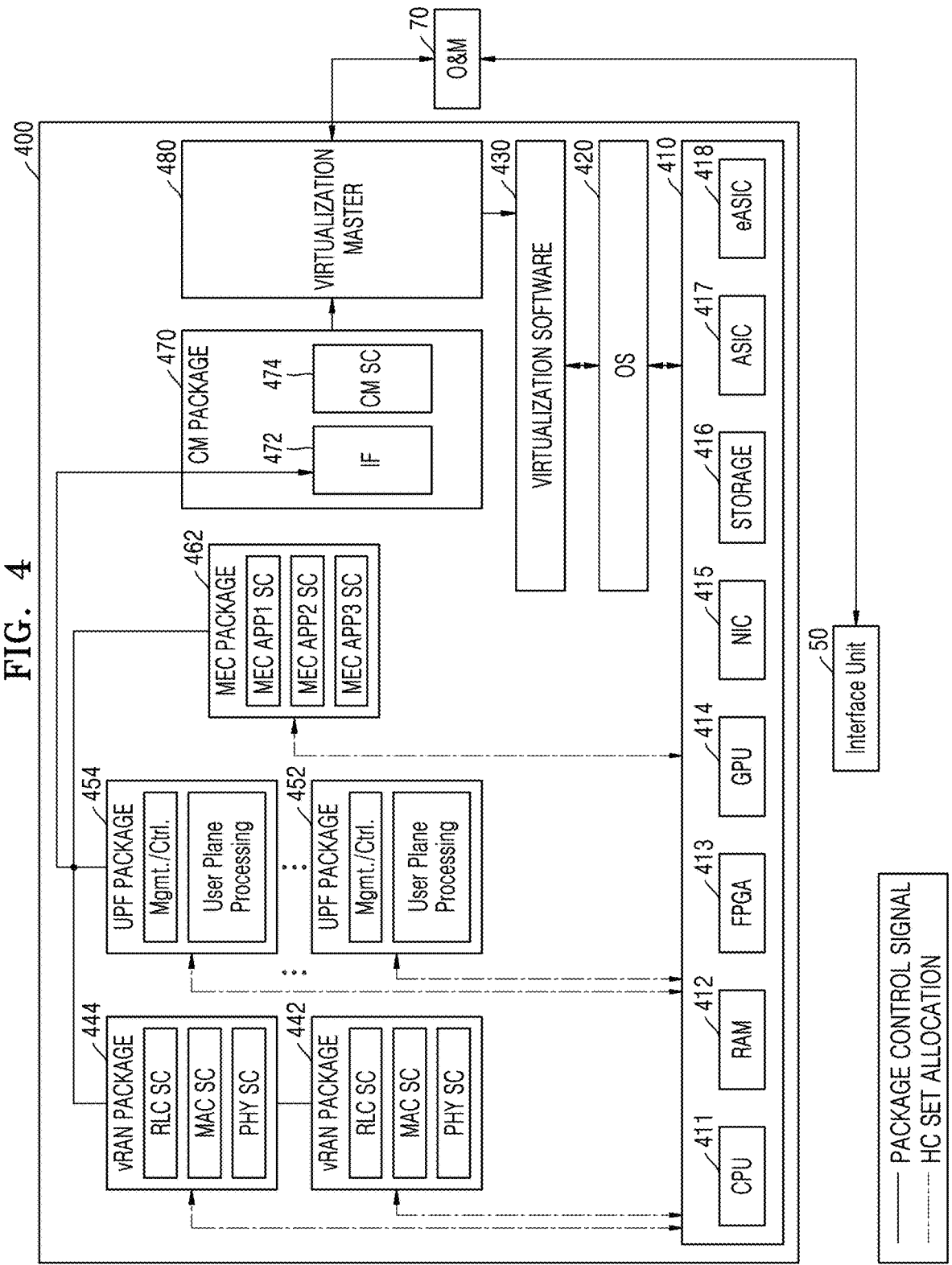
FIG. 4 is a diagram for describing hardware offloading according to an embodiment of the disclosure.

FIG. 4 is a diagram for describing hardware offloading according to an embodiment of the disclosure.

Hereinafter, in descriptions of FIG. 4, detailed descriptions that are redundant to those of FIG. 3 are not provided.

Referring to FIG. 4, a server 400 may include hardware 410, an OS 420, virtualization software 430, packages 442, 444, 452, 454, and 462 (also referred to as the vRAN package 442, the vRAN package 444, the UPF package 452, the UPF package 454, and the MEC package 462) to perform NFs, a CM package 470, and a virtualization master 480.

The CM package 470 monitors usage states of the software packages 442, 444, 452, 454, and 462 running in the server 400. According to an embodiment of the disclosure, the CM package 470 may monitor usage states of software packages by receiving vRAN package usage information from the vRAN package 442, by receiving UPF package usage information from the UPF package 452 or 454, and by receiving MEC package usage information from the MEC package 462, via an IF 472.

Also, the CM package 470 may obtain hardware usage information about all software packages included in the server 400. The hardware usage information may include, for example, information about an allocation state with respect to a package, use or non-use, a core load state, the number of processing cycles per core, or the like about each of HCs including a CPU 411, a RAM 412, an FPGA 413, a GPU 414, a NIC 415, a storage 416, an ASIC 417, and an eASIC 418, and may include same information as resource information included each package usage information.

A CM SC 474 may determine whether a change in a HC set used by the executed vRAN package 442 is required, i.e., may determine whether allocation of a new HC set is required, based on the vRAN package usage information, the UPF package usage information, the MEC package usage information, and the hardware usage information.

For example, the CM SC 474 may monitor the usage states of the software packages, based on the vRAN package usage information, the UPF package usage information, the MEC package usage information, and the hardware usage information. The monitoring may be continuously and periodically performed, and when a particular event causing a change in the usage states of the software packages, the monitoring may be additionally performed.

The CM SC 474 may determine whether it is required to change a HC set executing the vRAN package 442, based on obtained package usage information, and may determine hardware offloading, based on a result of the determination.

In the embodiment of FIG. 4, a case is described where hardware offloading to a GPU is performed when the vRAN package 442 is executed by a CPU, in other words, a case where offloading from a HC set using an entire CPU to a HC set using an entire GPU is performed.

As described above, when a bottleneck in data transmission occurs or occurrence of the bottleneck is predicted due to an increase in LDCP decoding computations in the vRAN package 442, the CM SC 474 may determine to offload the CPU 411 that is a HC allocated to the vRAN package 442, and may determine the GPU 414 as an optimal HC to be allocated. In this regard, the CM SC 474 may check whether there is an old package executed in the GPU 414. In the embodiment of FIG. 4, there is no package executed in the GPU 414, and thus, the GPU 414 may be allocated to the new vRAN package 444, without a separate procedure of securing the GPU 414.

According to another embodiment of the disclosure, hardware offloading may be performed between other packages or between other HCs.

According to an embodiment of the disclosure, the CM SC 474 may determine whether to perform hardware offloading and a HC to be offloaded, based on usage information for each package, by using a HC determination table. The HC determination table may include information about a combination available to each of packages executed in a server or information about priorities of HCs to be allocated to each of packages. Also, the HC determination table may be trained or updated, based on an artificial intelligence (AI) or machine learning technique.

When hardware offloading with respect to the vRAN package 442 is determined, the CM SC 474 may notify the virtualization master 480 of hardware offloading with respect to the vRAN package 442. The virtualization master 480 requests the virtualization software 430 or the OS 420 for distribution of the new vRAN package 444 and allocation of the GPU 414. When the virtualization software 430 or the OS 420 obtains the request of the distribution of the new vRAN package 444 and the allocation of the GPU 414, the virtualization software 430 or the OS 420 may generate (or install) the new vRAN package 444 by scaling-out instances equal to a SC included in the old vRAN package 442, and may allocate the GPU 414 to the newly-generated vRAN package 444. When SCs of the old vRAN package 442 using the CPU 411 are re-started in the new vRAN package 444, a resource of the CPU 411 which was used by the old vRAN package 442 is returned.

When the GPU 414 is allocated to the new vRAN package 444, the server 400 may command, via the O & M 70, the interface unit 50 to change a path of traffic occurring in a plurality of BSs (not shown) from the old vRAN package 442 to the new vRAN package 444.

When a change in a data traffic path is completed, the server 400 may delete (or end) the old vRAN package 442 by scaling-in instances of the SC included in the old vRAN package 442, and thus, may complete hardware offloading with respect to a vRAN package.

Figure 5:
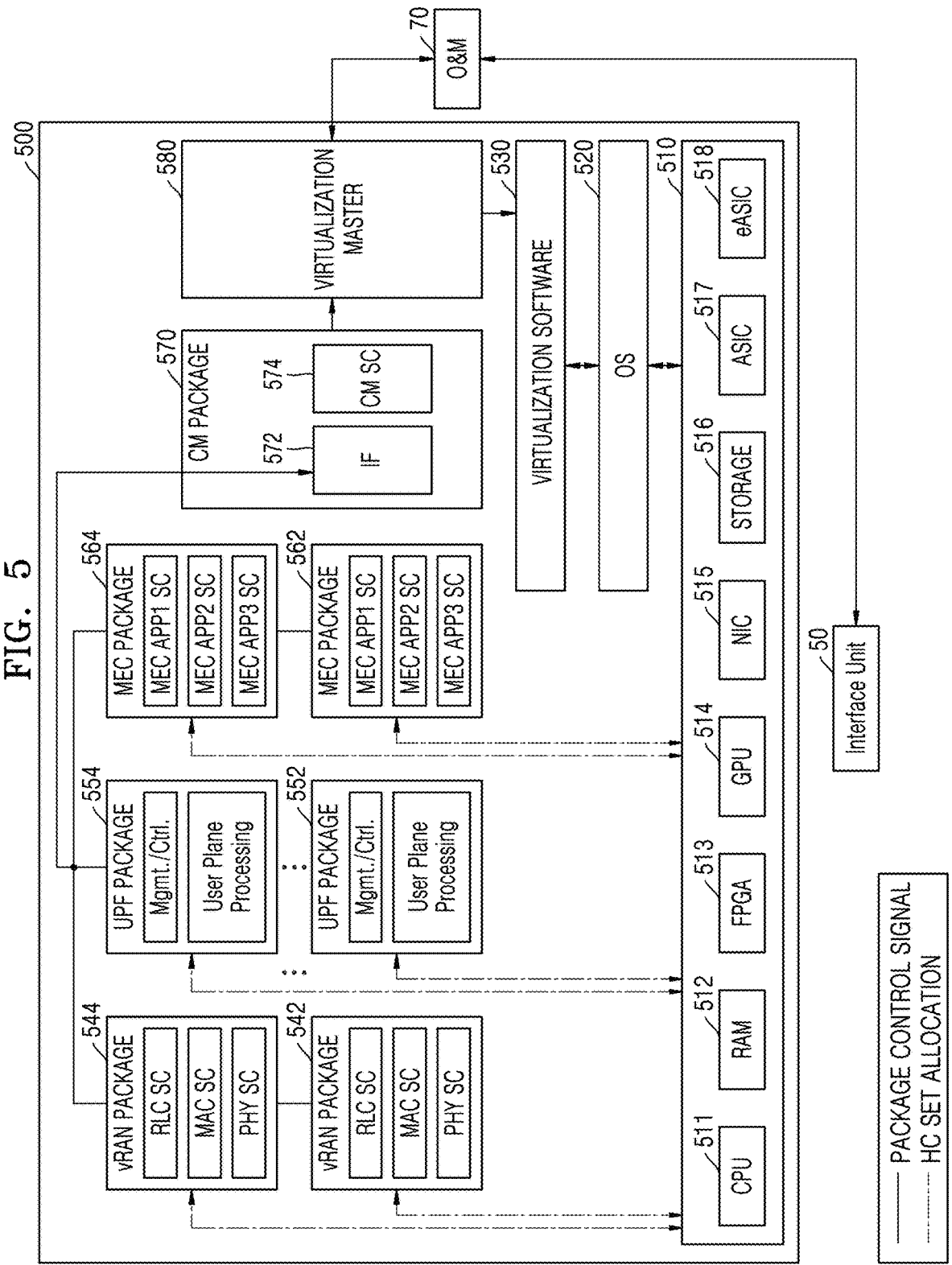
FIG. 5 is a diagram for describing hardware offloading according to another embodiment of the disclosure.

FIG. 5 is a diagram for describing hardware offloading according to another embodiment of the disclosure.

Hereinafter, in descriptions of FIG. 5, detailed descriptions that are redundant to those of FIGS. 3 and 4 are not provided.

Referring to FIG. 5, a server 500 may include hardware 510, an OS 520, virtualization software 530, packages 542, 544, 552, 554, 562, and 564 (also referred to as the vRAN package 542, the vRAN package 544, the UPF package 552, the UPF package 554, the MEC package 562, and the MEC package 564) to perform NFs, a CM package 570, and a virtualization master 580.

A CM SC 474 may determine whether a change in hardware executed by the executed vRAN package 542 is required, i.e., may determine whether allocation of new hardware is required, based on vRAN package usage information, UPF package usage information, MEC package usage information, and hardware usage information. The CM SC 574 may determine whether it is required to change a HC set executing the vRAN package 442, based on obtained package usage information, and may determine hardware offloading, based on a result of the determination.

In the embodiment of FIG. 5, it is assumed a case where the vRAN package 542 uses ⅔ of all cores of the CPU 511 and then additionally uses ½ of cores of the GPU 514 executing the MEC package 562, i.e., a case where hardware offloading from a HC set including only ⅔ of cores of a CPU to a HC set including ⅔ of cores of a CPU and ½ of cores of a GPU is performed.

As described above, when a bottleneck in data transmission occurs or occurrence of the bottleneck is predicted due to an increase in LDCP decoding computations in the vRAN package 542, the CM SC 574 may determine whether it is required to offload the CPU 511 that is a HC set allocated to the vRAN package 542, and may determine an optimal HC (e.g., ⅔ of cores of a CPU and ½ of cores of a GPU) to be newly allocated. In this regard, the CM SC 574 may check whether an entire usage amount of the GPU 514 is equal to or greater than a threshold value (e.g., 90% of all cores of the GPU 514). For example, when the MEC package 562 is using ⅓ of the cores of the GPU 514, an amount of using the GPU 514 by the vRAN package 542 and the MEC package 562 is equal to or greater than the threshold value, and thus, the CM SC 574 may determine a HC set (e.g., ⅕ of the cores of the CPU and ¼ of the cores of the GPU) to be newly allocated to the MEC package 562, and may perform hardware offloading. In this regard, a threshold value may vary for each hardware, and may be set to be an appropriate value for system operation.

According to another embodiment of the disclosure, hardware offloading may be performed between other software packages (e.g., a UPF package and an MEC package) or between other HCs (e.g., an FPGA and an eASIC).

According to an embodiment of the disclosure, the CM SC 574 may determine whether to perform hardware offloading and a HC to be offloaded, based on usage information for each package, by using a HC determination table. The HC determination table may include information about a combination available to each of packages executed in a server or information about priorities of HCs to be allocated to each of packages. Also, the HC determination table may be trained or updated, based on an artificial intelligence or machine learning technique.

When hardware offloading with respect to the vRAN package 542 and the MEC package 562 is determined, the CM SC 574 may notify the virtualization master 580 of hardware offloading with respect to the vRAN package 542 and the MEC package 562. In order to secure a hardware resource necessary for offloading, the CM SC 574 requests, via the virtualization master 580, the virtualization software 530 or the OS 520 for distribution of the new MEC package 564 and allocation of a new HC set (e.g., ⅔ of the cores of the CPU 511 and ½ of the cores of the GPU 514), and distribution of the new vRAN package 544 and allocation of a new HC set (e.g., ⅕ of the cores of the CPU 511 and ¼ of the cores of the GPU 514).

When the virtualization software 530 or the OS 520 obtains the request of the distribution of the new MEC package 564 and the allocation of the CPU 511, the virtualization software 530 or the OS 520 may generate (or install) the new MEC package 564 by scaling-out instances equal to a SC included in the old MEC package 562. When SCs of the old MEC package 562 using the GPU 514 are re-started in the new MEC package 564, a resource of the GPU 514 which was used by the old MEC package 562 is returned.

Also, when the virtualization software 530 or the OS 520 obtains the request of the distribution of the new vRAN package 544 and the allocation of the new HC set, the virtualization software 530 or the OS 520 may generate (or install) the new vRAN package 544 by scaling-out instances equal to a SC included in the old vRAN package 542. When SCs of the old vRAN package 542 using the CPU 511 are re-started in the new vRAN package 544, a resource of the CPU 511 which was used by the old vRAN package 542 is returned.

Afterward, the virtualization software 530 or the OS 520 may allocate the new HC set (e.g., ⅔ of the cores of the CPU 511 and ½ of the cores of the GPU 514) to the new vRAN package 544, and may allocate the new HC set (e.g., ⅕ of the cores of the CPU 511 and ¼ of the cores of the GPU 514) to the new MEC package 564.

When the HC sets are respectively allocated to the new vRAN package 544 and the new MEC package 564, the server 500 may command, via the O & M 70, the interface unit 50 to change a path of traffic occurring in a plurality of BSs (not shown) to the new vRAN package 544 an the new MEC package 564.

When a change in a data traffic path is completed, the server 500 may delete the old vRAN package 542 by scaling-in instances of the SC included in the old vRAN package 542, may delete the old MEC package 562 by scaling-in instances of the SC included in the old MEC package 562, and thus, may complete hardware offloading with respect to a vRAN package and an MEC package.

Figure 6:
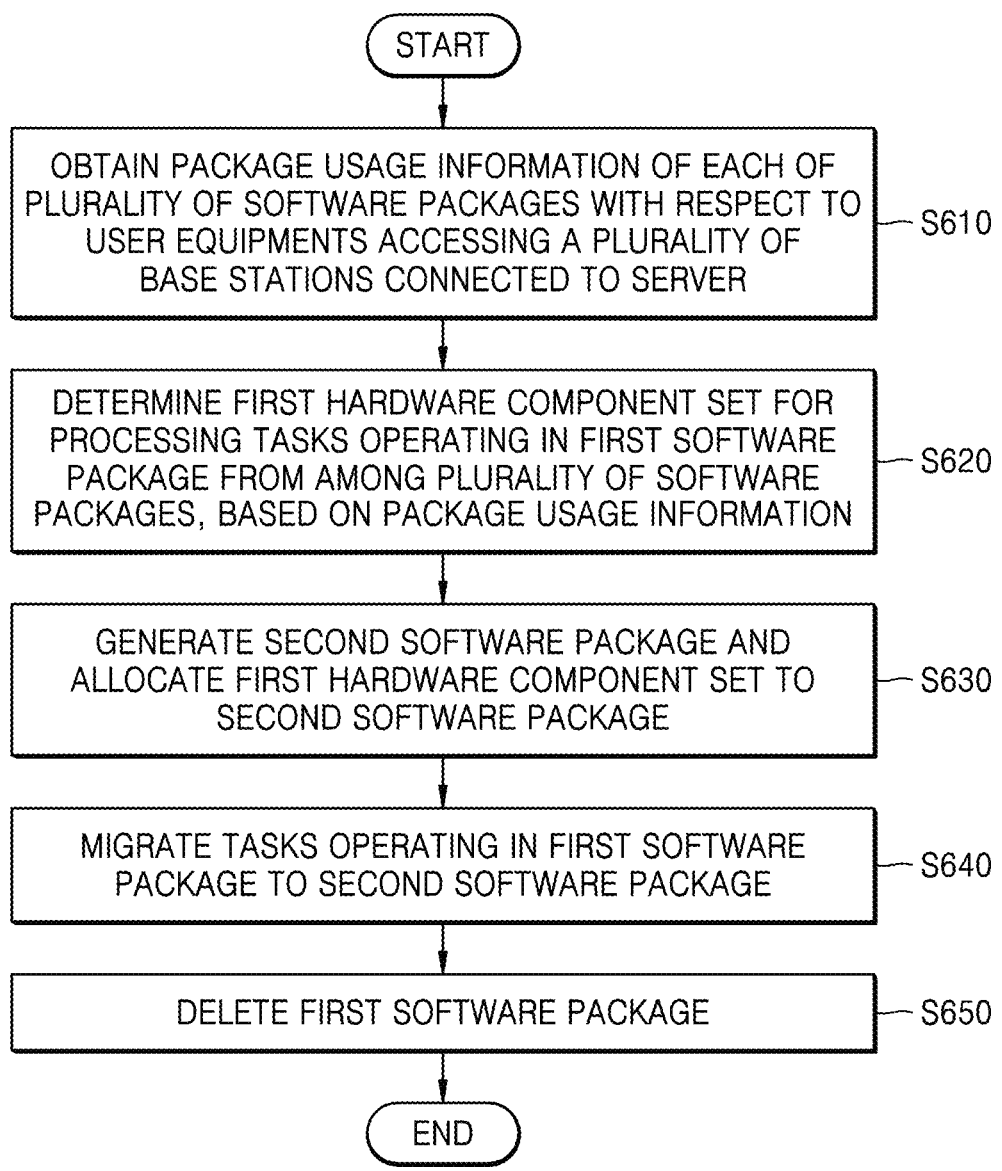
FIG. 6 is a flowchart for describing a method by which a server performs hardware offloading on software packages according to an embodiment of the disclosure.

FIG. 6 is a flowchart for describing a method by which a server performs hardware offloading on software packages according to an embodiment of the disclosure.

In operation S610, the server may obtain package usage information of each of a plurality of software packages with respect to UEs accessing a plurality of BSs connected to the server.

A software package is a minimum unit enabled to include one or more SCs performing NFs and sharing one IP, and an SC may be generated or removed in a unit of a package.

The plurality of software packages with respect to the UEs accessing the plurality of BSs connected to the server may include a vRAN package, an UPF package, or an MEC package. The vRAN package may include an SC to perform a RAN function, the UPF package may include an SC to perform a UPF, and the MEC package may include an SC to perform an MEC function.

The package usage information may include vRAN package usage information, UPF package usage information, or MEC package usage information. Also, the package usage information may include hardware usage information about all packages included in the server.

The vRAN package usage information may include vRAN traffic information and vRAN traffic processing information about traffic occurring in the plurality of BSs connected to the server.

The vRAN traffic information may include information about the number of cells processed by a vRAN package, a traffic processing speed (e.g., bps) per cell, the number of UEs connected to a BS, a bandwidth allocated to the BS, a spectrum sharing ratio between different wireless communication technologies, DL and UL processing times (DL/UL latency), the number of layers according to MIMO antenna of each BS, a resource usage amount (e.g., a percentage of PRB usage) by each BS, the frequency of handover of a UE, or the like.

As another example, the vRAN traffic information may include a type of a service causing the traffic, a frequency band in which the traffic occurs, a type of a wireless communication system (e.g., an NR or an LTE) in which the traffic occurs, or the like.

Also, the vRAN traffic processing information refers to information about a procedure of processing traffic, according to a RAN function. For example, the vRAN traffic processing information may include vRAN resource information used in processing traffic occurring in a plurality of BSs.

The vRAN resource information may directly or indirectly indicate a hardware resource used in processing vRAN traffic. The vRAN resource information may include a type of hardware allocated to a vRAN package, a ratio of a hardware core used in processing the vRAN traffic to hardware cores allocated to the vRAN package, the number of clock cycles used in processing vRAN traffic compared to a maximum hardware core clock cycle, a size of a memory allocated to the vRAN package so as to process the vRAN traffic, or the like. However, this is merely an example, and examples of the vRAN traffic information or the vRAN resource information are not limited thereto.

The UPF package usage information may refer to information about processing of user plane data transmitted from the vRAN package or the MEC package, and may include information about the number of UEs/sessions connected to a vRAN package, a UPF traffic processing rate (e.g., a packet per second), or the like.

The UPF package usage information may include, for example, UPF resource information used in processing the user plane data.

The UPF resource information may directly or indirectly indicate a hardware resource used in processing the user plane data, and for example, may include a type of hardware allocated to a UPF package, a ratio of a hardware core used in processing traffic to hardware cores allocated to the UPF package, the number of clock cycles used in processing the traffic compared to a maximum hardware core clock cycle, a size of a memory allocated to the UPF package so as to process the traffic, or the like. However, these are merely an example, and examples of the UPF package usage information or the UPF resource information are not limited thereto.

The MEC package usage information may indicate information about services provided via edge applications, and may include information about the number of the edge applications, the number of UEs connected to the edge applications, response times of the edge applications, types of the services, time periods of using the services, an amount of traffic occurrence due to usage of the services, locations of the UEs using the services, or the like.

The MEC package usage information may include, for example, MEC resource information used in processing edge application data.

The MEC resource information may refer to information capable of directly or indirectly indicating a hardware resource used in processing the edge application data, and may include a type of hardware allocated to an MEC package, a ratio of a hardware core used in processing traffic to hardware cores allocated to the MEC package, the number of clock cycles used in processing the traffic compared to a maximum hardware core clock cycle, a size of a memory allocated to the MEC package so as to process the traffic, or the like. However, this is merely an example, and examples of the MEC package usage information or the MEC resource information are not limited thereto.

Each of the packages may periodically deliver the package usage information or deliver the package usage information in response to occurrence of a preset event to a CM package, and the server may monitor HC usage states of the respective packages, based on the package usage information.

Also, the server may collect a plurality of pieces of resource information included in a plurality of pieces of the package usage information, thereby separately managing hardware usage information with respect to HCs used by all packages. The hardware usage information may include, for example, information about an allocation state with respect to a package, use or non-use, a core load state, the number of processing cycles per core, or the like about each of HCs.

In operation S620, the server may determine a first HC set for processing tasks operating in a first software package from among the plurality of software packages, based on the package usage information of each of the plurality of software packages.

A CM SC may determine at least one HC to execute a software package in the server, based on the vRAN package usage information, the UPF package usage information, the MEC package usage information, and the hardware usage information. In detail, the CM SC may determine the number of SCs in software, a type and a usage amount of a HC to execute a resource and the software, and the like, based on an amount of traffic predicted to occur, a type of the traffic, traffic processing requirement performance, a service type required by a UE, and the like. Detailed descriptions thereof will be provided below with reference to FIGS. 8 to 11.

In operation S630, the server may generate a second software package and may allocate the first HC set to the second software package.

In order to allocate a new HC, the CM package may request a virtualization master to generate a new software package capable of processing the tasks operating in the first software package. When the virtualization master obtains the request of generating the new software package, the virtualization master may generate the second software package by scaling-out instances equal to a SC included in the first software package.

The CM package may request the virtualization master to allocate a HC to the generated software package, along with the request of generating the software package. When the virtualization master obtains the request of allocating the HC, the virtualization master may allocate the first HC set to the newly-generated second software package, the first HC set is determined in operation S620.

In operation S640, the server may migrate the tasks operating in the first software package to the second software package.

Afterward, the CM package may request a data path change request to an O & M package so as to change a data path from the first software package to the second software package. When the O & M package obtains the data path change request, the O & M package may communicate with an interface unit and thus may transmit the data path change request to the plurality of BSs connected to the server. In operation S650, the server may delete the first software package.

When the tasks operating in the first software package are migrated to the second software package, the CM package may request the virtualization master to delete the first software package. When the virtualization master obtains the request of deleting the first software package, the virtualization master may delete the first software package by removing instances by scaling-in the instances of the SC included in the first software package. When the first software package is deleted, HCs executing the first software package are released.

Figure 7:
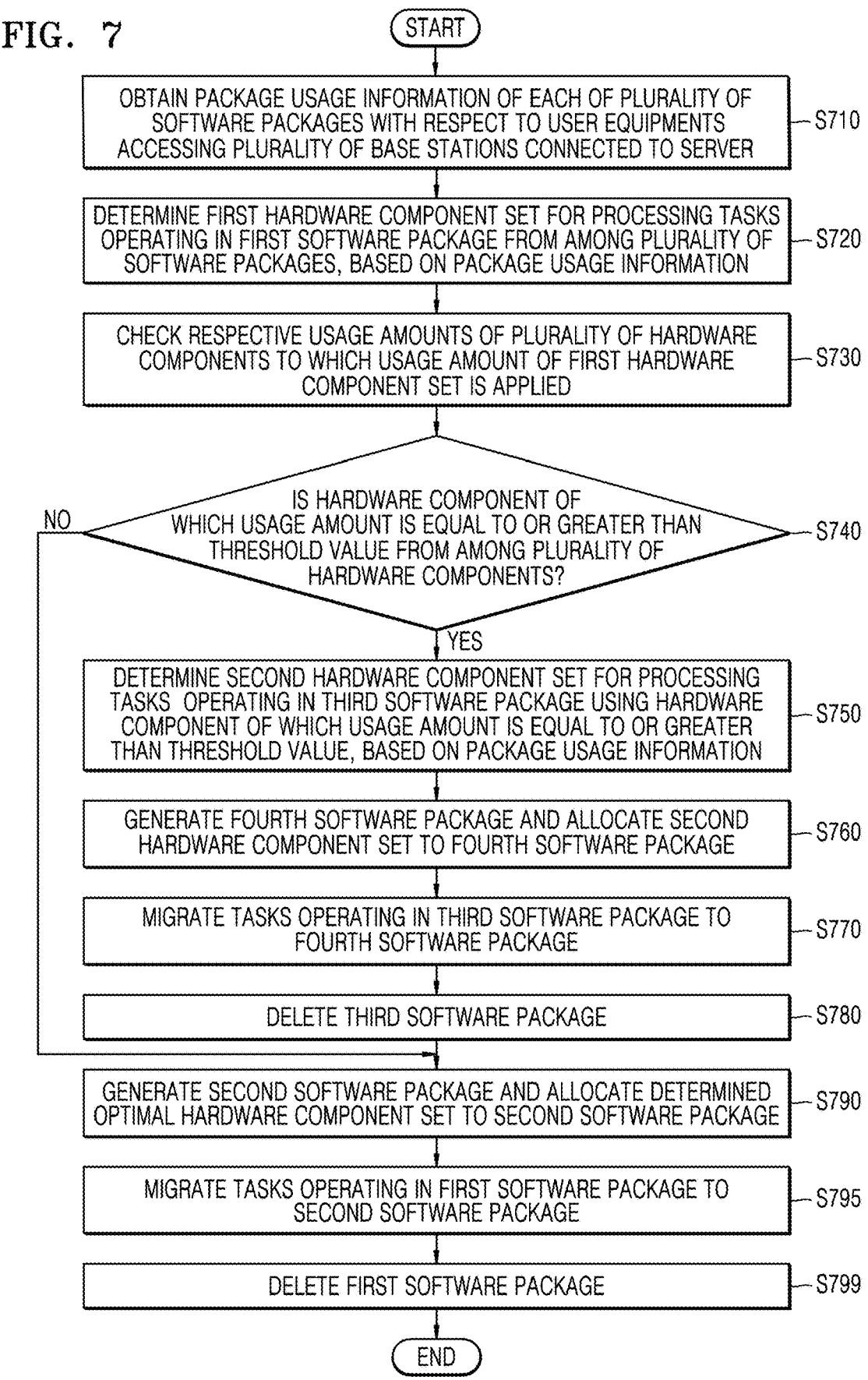
FIG. 7 is a flowchart for describing a method by which a server performs hardware offloading on software packages according to another embodiment of the disclosure.

FIG. 7 is a flowchart for describing a method by which a server performs hardware offloading on packages that perform NFs according to another embodiment of the disclosure.

Hereinafter, in descriptions of FIG. 7, detailed descriptions that are redundant to those of FIG. 6 are not provided.

In operation S710 to operation S720, the server may obtain package usage information of each of a plurality of software packages with respect to UEs accessing a plurality of BSs connected to the server, and may determine a first HC set for processing tasks operating in a first software package from among the plurality of software packages, based on the obtained package usage information. Operation S710 to operation S720 are equal to operation S610 to operation S620.

When a usage amount of a HC to be newly applied to a package for which hardware offloading is determined is greater than a preset threshold value, a separate procedure of securing the HC is required.

To this end, the embodiment of FIG. 7 further includes operation S730 in which the server checks respective usage amounts of a plurality of HCs to which a usage amount of the first HC set is applied, and operation S740 in which the server compares each of the usage amounts of the plurality of HCs with the threshold value. As a result of the comparison in operation S740, when each of the usage amounts of the plurality of HCs is smaller than the threshold value, i.e., when a HC to be applied to process the tasks operating in the first software package is an idle resource, operation S790 to operation S799 are immediately performed, and those operations are equal to operation S630 to operation S650 of FIG. 6.

As a result of the comparison in operation S740, when there is a HC of which usage amount is equal to or greater than the threshold value from among the plurality of HCs, operation S750 to operation S780 are performed and then operation S790 is performed.

In operation S750, the server may determine a second HC set for processing tasks operating in a third software package using the HC of which usage amount is equal to or greater than the threshold value, based on the package usage information of each of the plurality of software packages.

A CM SC may determine a HC set to execute a software package in the server, based on vRAN package usage information, UPF package usage information, MEC package usage information, and hardware usage information. In this regard, a total usage amount of each of HCs to be newly applied to the third software package may be determined to be equal to or smaller than the threshold value.

In operation S760, the server may generate a fourth software package and may allocate the second HC set to the fourth software package.

In order to allocate a new HC, a CM package may request a virtualization master to generate a new software package capable of processing the tasks operating in the third software package. When the virtualization master obtains the request of generating the new software package, the virtualization master may generate the fourth software package by scaling-out instances equal to a SC included in the third software package.

The CM package may request the virtualization master to allocate a HC to the generated software package, along with the request of generating the software package. When the virtualization master obtains the request of allocating the HC, the virtualization master may allocate the second HC set to the newly-generated fourth software package, the second HC set is determined in operation S750.

In operation S770, the server may migrate the tasks operating in the third software package to the fourth software package.

Afterward, the CM package may request a data path change request to an O & M package so as to change a data path from the third software package to the fourth software package. When the O & M package obtains the data path change request, the O & M package may communicate with an interface unit and thus may transmit the data path change request to the plurality of BSs connected to the server.

In operation S780, the server may delete the third software package.

When the tasks operating in the third software package are migrated to the fourth software package, the CM package may request the virtualization master to delete the third software package. When the virtualization master obtains the request of deleting the third software package, the virtualization master may delete the third software package by removing instances by scaling-in the instances of the SC included in the third software package.

When the third software package is deleted, HCs executing the third software package are released. When the HCs executing the third software package are released, the virtualization master may allocate a released idle resource to the second software package.

Operation S790 to operation S799 are equal to operation S630 to operation S650 of FIG. 6, and thus, detailed descriptions thereof are not provided.

Figure 8:
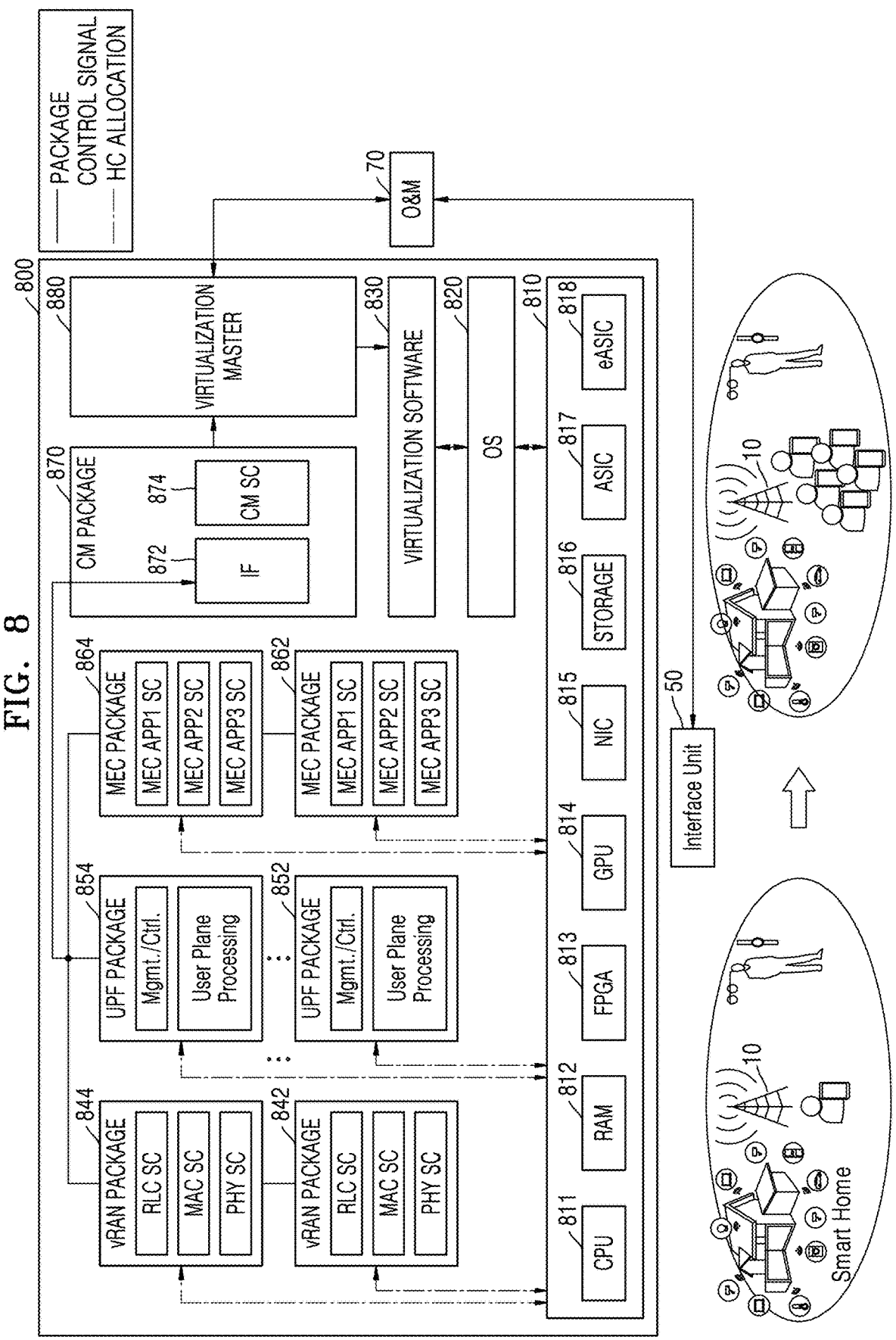
FIG. 8 is a diagram for describing a method by which a server determines hardware components (HCs) in which software packages are executed, when an increase in an amount of virtualized RAN (vRAN) package traffic is predicted, according to an embodiment of the disclosure.

FIG. 8 is a diagram for describing a method by which a server 800 determines HCs in which software packages are executed, when an increase in an amount of vRAN package traffic is predicted, according to an embodiment of the disclosure.

Referring to FIG. 8, the server 800 may drive an SC package for virtualizing an NF via hardware 810 included in the server 800. In detail, an OS 820 may be driven in the hardware 810, and the OS 820 may manage the hardware 810 and virtualization software 830. Descriptions of the hardware 810, the OS 820, and the virtualization software 830 are equal to those provided with reference to FIG. 3, and thus, are not provided here. With respect to UPF packages 852 and 854, it is assumed a case where there is no change in a HC that executes the UPF packages 852 and 854, and thus, illustration and descriptions thereof are omitted.

Hereinafter, operations of a server which are described above with reference to FIGS. 3 to 5 will now be particularly described so as to describe a method of determining HCs to execute SC packages respectively virtualizing a vRAN function and an MEC function, based on vRAN package usage information and MEC package usage information including traffic processing information of traffic to occur by UEs.

In the embodiment of FIG. 8, it is assumed a case where hardware offloading occurs when a vRAN package 842 is executed in an FPGA 813 and an MEC package 862 is executed in a GPU 814.

The vRAN package 842 may be forwarded traffic occurring in a BS 10. A PHY SC, a MAC SC, and an RLC SC included in the vRAN package 842 may respectively perform a PHY layer function, a MAC layer function, and an RLC layer function on the forwarded traffic. The vRAN package 842 may deliver the vRAN package usage information including the traffic processing information to a CM package 870.

Also, traffic that occurs due to execution of an application using an MEC service from among the traffic forwarded to the vRAN package 842 may be forwarded to the MEC package 862. Traffic that does not use the MEC service from among the traffic forwarded to the vRAN package 842 may be forwarded to another server outside the server 800, and in the disclosure, descriptions of a method of processing the traffic in the other server outside the server 800 are not provided.

The MEC package 862 may process the traffic due to the MEC service, the traffic is forwarded from the vRAN package 842. Also, the MEC package 862 may provide the MEC package usage information to the CM package 870. The MEC package 862 may include a plurality of MEC app SCs, and descriptions thereof correspond to what are described above with reference to FIG. 2 and thus are not provided here. The MEC package 862 may deliver, to the CM package 870, the MEC package usage information including information about a type of the MEC service, a time period of using the MEC service, an amount of traffic occurred by using the MEC service, and the like. In the present embodiment of the disclosure, the MEC service may refer to services provided by IoT devices in a house and wearable devices, but these are merely an example and the MEC service is not limited to the aforementioned example.

The CM package 870 may include an IF 872 and a CM SC 874. Based on the vRAN package usage information and the MEC package usage information received via the IF 872, the CM SC 874 may obtain information about traffic and an MEC service usage amount which are to occur by UEs accessing the BS 10.

In this regard, the vRAN package 842 and the MEC package 862 may periodically deliver the vRAN package usage information and the MEC package usage information to the CM package 870.

According to an embodiment of the disclosure, the vRAN package 842 may deliver, to the CM package 870, priority information based on performance of HCs capable of executing the vRAN package 842. For example, the vRAN package 842 may be executed in a CPU 811, the FPGA 813, or the GPU 814, and may show highest performance when executed in the GPU 814, show second-highest performance when executed in the FPGA 813, and show third-highest performance when executed in the CPU 811. Alternatively, the vRAN package 842 may show highest performance when co-executed in the CPU 811 and the GPU 814, show second-highest performance when co-executed in the GPU 814 and the FPGA 813, and show third-highest performance when co-executed in the CPU 811 and the FPGA 813.

Also, the MEC package 862 may deliver, to the CM package 870, priority information about performance of HCs capable of executing the MEC package 862. For example, the MEC package 862 may be executed in the CPU 811 and the GPU 814, and may show highest performance when executed in the GPU 814 and show second-highest performance when executed in the CPU 811. Alternatively, the MEC package 862 may show highest performance when co-executed in the CPU 811 and the GPU 814, show second-highest performance when executed in the GPU 814, and show third-highest performance when executed in the CPU 811.

In FIG. 8, for convenience of descriptions, it is assumed a case where the FPGA 813 is allocated only to the vRAN package 842 (the vRAN package 842 uses the entirety of the FPGA 813) and the GPU 814 is allocated only to the MEC package 862 (the MEC package 862 uses the entirety of the GPU 814), and then, as allocation of a new HC to a vRAN package is required, a HC allocated to the vRAN package 842 is hardware-offloaded from the FPGA 813 to the GPU 814, and a HC allocated to the MEC package 862 is hardware-offloaded from the GPU 814 to the CPU 811.

However, the scope of the disclosure is not limited thereto, and a server according to an embodiment of the disclosure may allocate a HC set to one software package as described above, and the HC set may be determined based on use or non-use and a usage amount of each of a plurality of HCs.

For example, it is assumed a case where UEs that access the BS 10 are increased at a particular time in a region with a high floating population.

In this case, traffic increases as UEs increase, such that a physical resource usage by a RAN layer is increased. The increase in the physical resource usage may be determined based on a usage percentage of a PRB. Also, a MIMO system may be configured to support more layers, i.e., to use more transmission and reception antennas, in response to an increase in traffic. Therefore, in such a case, it may be determined that a load is to occur in the vRAN package 842 to process the traffic.

Also, as it is a region with a high floating population, it may be determined that a usage rate of a high-performance MEC service using a GPU, e.g., a high-performance service such as an augmented reality (AR)/virtual reality (VR) service, is not high.

According to an embodiment of the disclosure, the CM package 870 may calculate a trend of performance data of the vRAN package 842 according to time and may predict a load.

For example, the CM package 870 may determine a trend in an increase or decrease in the number of connected UEs by using a regression model.

According to another embodiment of the disclosure, the CM package 870 may track a change in UL/DL channel processing latency due to the number of layers and a PRB usage, and when the UL/DL channel processing latency is greater than a preset threshold value (e.g., 0.5 ms), the CM package 870 may determine to use a HC that provides higher performance.

The CM package 870 may predict a load of the vRAN package 842 by using a rule-based or AI/machine-learning (ML)-based technique. For example, in a case where the CM package 870 predicts and determines the load of the vRAN package 842, based on the number of UL layers, the CM package 870 may determine to execute the vRAN package 842 in a CPU when the number of UL layer is equal to or less than 2, to execute the vRAN package 842 in a FPGA when the number of UL layer is equal to or less than 4, and to execute the vRAN package 842 in a GPU when the number of UL layer is greater than 4.

Also, the CM package 870 may calculate a trend of performance data of the MEC package 862 according to time. For example, the CM package 870 may track a request per second at which a UE connected to the MEC package 862 uses an MEC service, and when a request per second with respect to MEC service connection is smaller than a preset threshold value (e.g., one request per second), the CM package 870 may determine that it is acceptable to execute the MEC package 862 in a HC with low performance.

For example, based on the number of UEs accessing the BS 10 and types of applications used by each of the accessing UEs at each time slot of each day of the week, as illustrated in FIG. 8, the CM SC 872 may predict that an amount of traffic is increased by at least A threshold due to an increase in users using smartphones, and an MEC service usage amount occupies less than X % of an amount of traffic, in a time slot of t1-t2 on every Monday.

As it is predicted that the amount of traffic is to be increased by at least A threshold, in order to increase traffic processing speed, the CM SC 872 may determine to perform hardware offloading to allow the vRAN package 842 running in the CPU 811 to be executed in the GPU 814. As the GPU 814 stores a pre-set function in an application programming interface (API) so as to process traffic, the GPU 814 may further rapidly process the traffic, based thereon. Accordingly, the CM SC 872 may control instructions constituting the vRAN package 842 so as to allow the vRAN package 842 to be executed in the GPU 814.

The CM SC 872 checks whether there is a package running in the GPU 814, and as the GPU 814 currently executes the MEC package 862, the CM SC 872 determines a new HC to be allocated to the MEC package 862.

As it is predicted that the MEC service usage amount is to occupy less than X % of the amount of traffic, the CM SC 872 may determine to perform hardware offloading to allow the MEC package 862 running in the GPU 814 to be executed in the CPU 811 so as to provide, for execution of a vRAN package 844, a resource of the GPU 814 currently executing the MEC package 862.

In order to release the GPU 814 from the MEC package 862, the CM SC 872 generates a new MEC package 864 performing a same function as the MEC package 862. When the MEC package 864 is generated, the CM SC 872 allocates the CPU 811 to the new MEC package 864, and then requests the interface unit 50 to change a traffic path from the old MEC package 862 to the new MEC package 864 and deletes the old MEC package 862.

In order to allocate the GPU 814 released from the MEC package 862, the CM SC 872 generates the new vRAN package 844 and allocates the GPU 814 to the newly-generated vRAN package 844. Afterward, the CM SC 872 requests the interface unit 50 to change a traffic path from the old vRAN package 842 to the new vRAN package 844, deletes the old vRAN package 842, and thus, completes hardware offloading.

Figure 9:
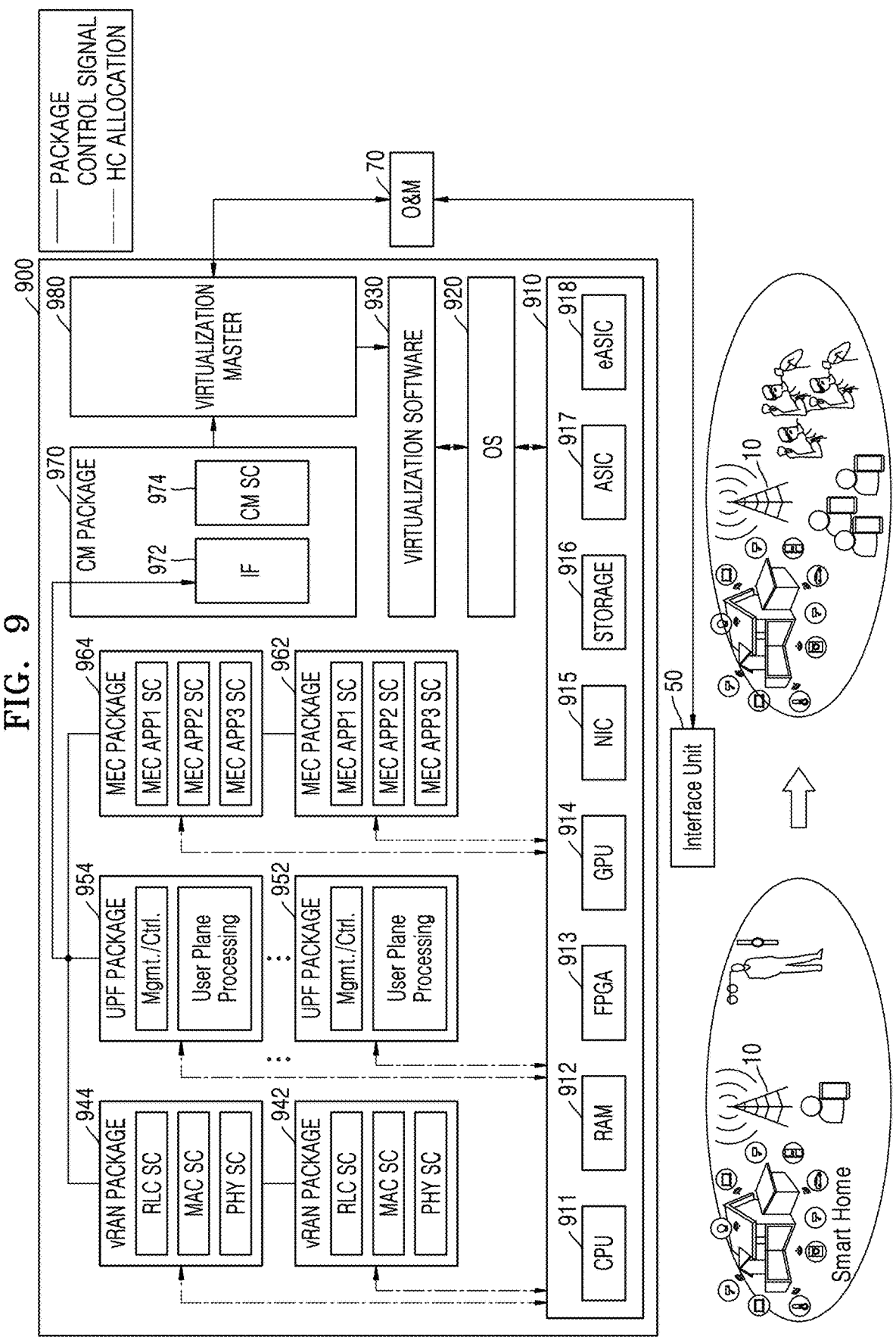
FIG. 9 is a diagram for describing a method by which a server determines HCs in which software packages are executed, when an increase in an amount of traffic and an MEC service usage amount is predicted, according to another embodiment of the disclosure.

FIG. 9 is a diagram for describing a method by which a server 900 determines HCs in which software packages are executed, when an increase in an amount of traffic and an MEC service usage amount is predicted, according to another embodiment of the disclosure.

Referring to FIG. 9, the server 900 may drive an SC package for virtualizing an NF via hardware 910 included in the server 900. In detail, an OS 920 may be driven in the hardware 910, and the OS 920 may manage the hardware 910 and virtualization software 930. Descriptions of the hardware 910, the OS 920, and the virtualization software 930 are equal to those provided with reference to FIG. 3, and thus, are not provided here. With reference to FIG. 9, detailed descriptions that are redundant to those of FIG. 8 are not provided.

As in FIG. 8, in FIG. 9, it is assumed a case where one HC is allocated to one software package and is exclusively occupied by one software package, but a server according to an embodiment of the disclosure may allocate a HC set to one software package as described above, and the HC set may be determined based on use or non-use and a usage amount of each of a plurality of HCs.

In the embodiment of FIG. 9, it is assumed a case where an MEC service is provided for people in a particular time at a particular place, e.g., a case where a real-time AR/VR service event is performed for spectators in a large-scale stadium.

ACM package 970 monitors package usage information of an MEC package 962, package usage information of a vRAN package 942, and package usage information of UPF packages 952 and 954.

As a load due to rendering and encoding processing for providing an AR/VR service in a corresponding time occurs in the MEC package 962, a packet per second of an AR/VR MEC service provided by the MEC package 962 is increased, and a usage amount of a HC (e.g., a CPU 911) allocated to the MEC package 962 is sharply increased. As a load due to data traffic processing for providing the AR/VR service to the spectators in the corresponding time occurs in the vRAN package 942, a PRB usage amount and a cell throughput are sharply increased. As an increase in traffic for the MEC service occurs in the corresponding time, a user plane data throughput is also increased in the UPF packages 952 and 954.

As a result of monitoring the MEC package usage information, when a packet per second and a usage amount of a currently-used HC are equal to or greater than a preset threshold value, the CM package 970 may determine an MEC package to be executed in a HC providing higher performance than a current level.

Also, as a result of monitoring the vRAN package usage information, when the PRB usage amount and the cell throughput are equal to or greater than a preset threshold value, the CM package 970 may determine a vRAN package to be executed in a HC providing higher performance than a current level.

The CM package 970 may select, from among available HCs, a combination of HCs capable of executing all of the vRAN package and the MEC package, and may allocate the selected combination of HCs to the vRAN package and the MEC package.

For example, when the vRAN package is executable in {GPU, FPGA} according to performance priority, and the MEC package is executable in {GPU}, the CM package 970 may determine the vRAN package to be executed in an FPGA 913 and determine the MEC package to be executed in a GPU 914.

When the vRAN package 942 is running in the FPGA 913, the CM package 970 maintains a HC allocated to the vRAN package 942, and offloads a HC allocated to the MEC package 962 from the CPU 911 to the GPU 914.

When the vRAN package 942 is running in the GPU 914, the CM package 970 offloads a HC allocated to the vRAN package 942 from the GPU 914 to the FPGA 913, and offloads a HC allocated to the MEC package 962 from the CPU 911 to the GPU 914.

A method of offloading HCs with respect to the vRAN package 942 and the MEC package 962 is described above, and thus, detailed descriptions thereof are not provided here.

Also, as a result of monitoring the UPF package usage information, when the user plane data throughput is equal to or greater than a preset threshold value, in order to secure processing performance of the UPF packages 952 and 954, the CM package 970 may determine to allocate more cores to the CPU 911 that is a HC previously allocated to the UPF packages 952 and 954.

Figure 10:
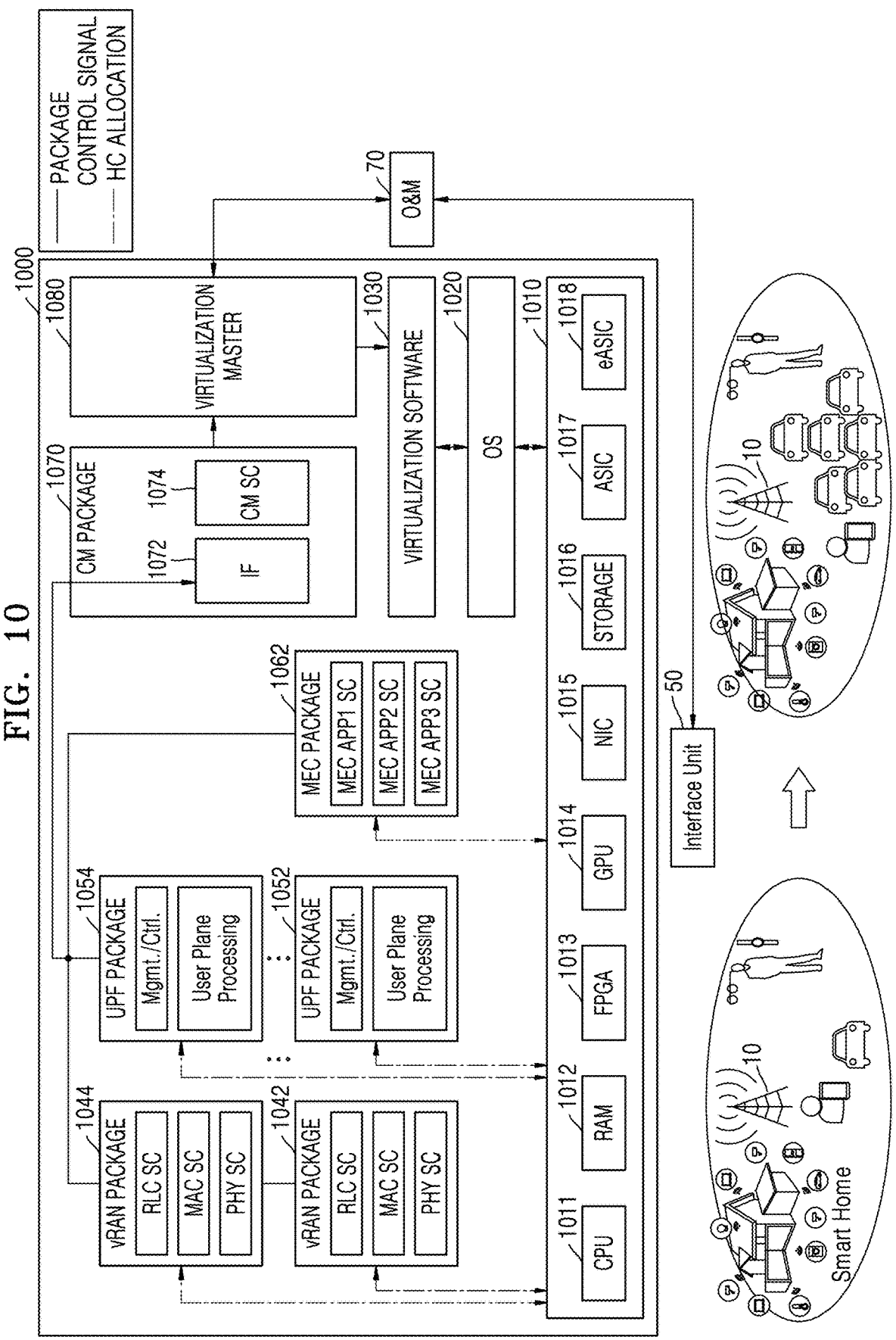
FIG. 10 is a diagram for describing a method by which a server determines HCs in which software packages are executed, when an increase in a load of an MEC service is predicted, according to another embodiment of the disclosure.

FIG. 10 is a diagram for describing a method by which a server 1000 determines HCs in which software packages for virtualizing NFs are executed, when an increase in a load of an MEC service is predicted, according to another embodiment of the disclosure.

Referring to FIG. 10, the server 1000 may drive an SC package for virtualizing an NF via hardware 1010 included in the server 1000. In detail, an OS 1020 may be driven in the hardware 1010, and the OS 1020 may manage the hardware 1010 and virtualization software 1030. Descriptions of the hardware 1010, the OS 1020, and the virtualization software 1030 are equal to those provided with reference to FIG. 3, and thus, are not provided here. With respect to UPF packages 1052 and 1054, it is assumed a case where there is no change in a HC that executes the UPF packages 1052 and 1054, and thus, illustration and descriptions thereof are omitted.

With reference to FIG. 10, detailed descriptions that are redundant to those of FIG. 8 or 9 are not provided.

As in FIG. 8, in FIG. 10, it is assumed a case where one HC is allocated to one software package and is exclusively occupied by one software package, but a server according to an embodiment of the disclosure may allocate a HC set to one software package as described above, and the HC set may be determined based on use or non-use and a usage amount of each of a plurality of HCs.

In the embodiment of FIG. 10, it is assumed a case where an increase in a load of an MEC service is predicted, e.g., a case where vehicle-to-everything (V2X)-based autonomous vehicles are increased on the road.

The V2X-based autonomous vehicles use a cooperative sensing service. The cooperative sensing service refers to a service of performing sensing and notifying an accident in the front by combining a plurality of pieces of data sensed by nearby vehicles.

For such a service related to autonomous vehicles, if a service response time is delayed, the delay has a severe bad influence on safety, such that it is recommended that vRAN, UPF, and MEC operate in one server.

The autonomous vehicles using the cooperative sensing service transmit, to an adjacent MEC server, sensory data obtained from all sensors arranged in vehicles. Also, some representative vehicles from among all vehicles on the road are selected to transmit, to an adjacent MEC server, images captured by using cameras arranged in the vehicles. The captured images include wide front areas, and thus, it is not necessary for all vehicles to transmit captured images to a server.

The cooperative sensing service has a characteristic in that a size of sensory data is small and only a small number of vehicles upload captured images such that heavy network traffic does not occur, however, overhead is caused to perform AI/ML inference based on the received sensory data and the images.

In a common case, when not many autonomous vehicles are on the road, a vRAN package 1042 and an MEC package 1062 may be executed in one GPU 1014. In a case where the vRAN package 1042 and the MEC package 1062 are executed in one GPU 1014, one physical GPU 1014 may be divided into multiple virtual GPUs (vGPUs) and used, and for example, the multiple vGPUs may be implemented by using a multi-instance GPU technology.

A CM package 1070 monitors package usage information of the MEC package 1062 and package usage information of the vRAN package 1042.

As a result of monitoring the MEC package usage information, when it is predicted that, as autonomous vehicles are increased on the road, a load is to occur in the MEC package 1062, compared to the vRAN package 1042, that is, when AI/ML analysis is increased according to an increase in vehicle sensory data, and thus, a use rate of a currently-located HC (e.g., the GPU 1014) is sharply increased and thus exceeds a preset threshold value, the CM package 1070 may determine only the MEC package 1062 to be allocated to one physical GPU 1014 and to perform AI/ML inference.

Also, in this case, because an amount of traffic for providing a service is not sharply increased even when the number of connected terminals (e.g., vehicles) is increased, a PRB usage is equal to or greater than a preset threshold value as a result of monitoring the vRAN package usage information, such that the CM package 1070 may determine to perform hardware offloading to change a HC allocated to the vRAN package 1042 from a GPU 1014 to an FPGA 1013.

A method of offloading a HC from the vRAN package 1042 is described above, and thus, detailed descriptions thereof are not provided here.

Figure 11:
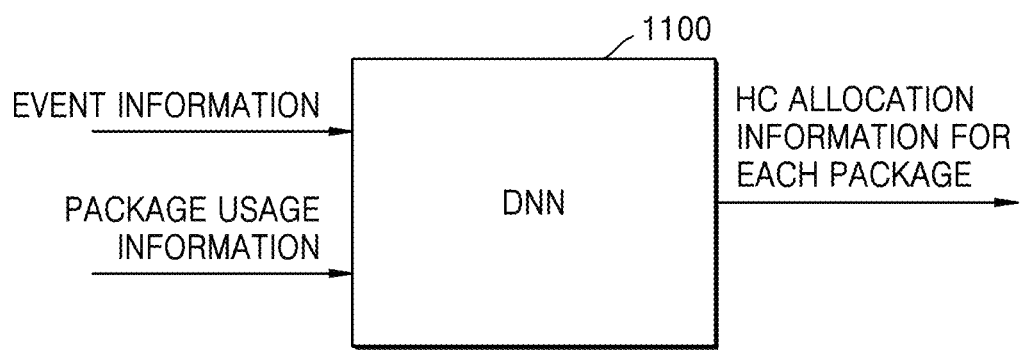
FIG. 11 is a diagram for describing an artificial intelligence (AI) model used in determining a HC in which a software package is executed according to an embodiment of the disclosure.

FIG. 11 is a diagram for describing an AI model 1100 used in determining a HC in which a software package is executed according to an embodiment of the disclosure.

Referring to FIG. 11, event information, package usage information, and HC priority information may be applied as input data to the AI model 1100 (e.g., a deep neural network (DNN)). A server described above with reference to FIG. 3 may train the AI model 1100, based on a result of comparison between evaluation data and output data obtained as a result of applying the input data to the AI model 1100.

For example, the server may apply various input data to the AI model 1100 until a difference between the output data and the evaluation data becomes smaller than a preset threshold value. In another example, the server may train the AI model 1100 by applying, to the AI model 1100, the input data and a difference value between the output data and the evaluation data. Through the training, values of parameters of layers constituting a neural network of the AI model 1100 may be updated. However, this is merely an example, and a method of training an AI model is not limited to the aforementioned examples.

The event information may include information about an event that periodically occurs (e.g., an increase in a floating population at a particular time slot in a particular region), an one-time event (e.g., provision of an AR/VR service at a particular time slot in a particular region), an unexpected event (e.g., an increase in autonomous vehicles due to occurrence of traffic congestion), or the like.

The server according to an embodiment of the disclosure may obtain information about HC allocation for each package by inputting newly-obtained event information, package usage information, and HC priority information to the AI model 1100 for which training has been completed.

Figure 12:
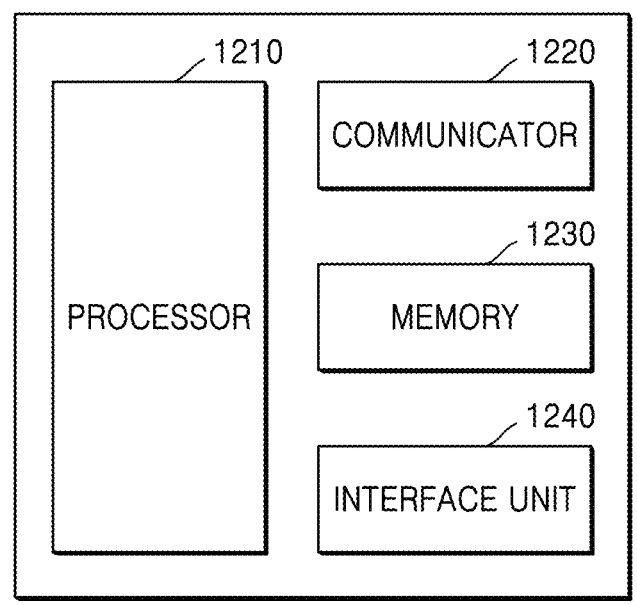
FIG. 12 is a block diagram of a server according to an embodiment of the disclosure.

FIG. 12 is a block diagram of a server 1200 according to an embodiment of the disclosure.

As illustrated in FIG. 12, the server 1200 according to the disclosure may include a processor 1210, a communicator 1220, a memory 1230, and an interface unit 1240.

However, components of a data transmitting apparatus are not limited to the above example. For example, the data transmitting apparatus may include more or fewer components than the afore-described components. Also, the processor 1210, the communicator 1220, the memory 1230, and the interface unit 1240 may be implemented as one chip. Only components related to an embodiment are illustrated in the data transmitting apparatus of FIG. 12. Therefore, one of ordinary skill in the art may understand that there may be other general-use components in addition to the components shown in FIG. 12.

The processor 1210 may control a series of processes for transmitting data (e.g., a packet), which are described with reference to FIGS. 1 to 11. In more detail, the processor 1210 may determine and perform hardware offloading of packages including SCs for virtualizing NFs. The processor 1210 may refer to a plurality of processors, and may perform the afore-described retransmitting operation by executing a plurality of instructions (or, a program) stored in the memory 1230.

According to an embodiment of the disclosure, the processor 1210 may control a series of processes in which the server 1200 can operate, which are illustrated in FIGS. 1 to 11. For example, the server 1200 may be implemented as a plurality of instructions (or, a program). The processor 1210 may perform operations of the server 1200 by executing the plurality of instructions (or, the program).

Also, the processor 1210 may control generation functions to control the data transmitting apparatus. For example, the processor 1210 may generally control the data transmitting apparatus by executing programs stored in the memory 1230 in the data transmitting apparatus. The processor 1210 may be implemented as a CPU, a GPU, an application processor (AP), or the like arranged in the data transmitting apparatus, but is not limited thereto.

The communicator 1220 may connect the server 1200 with another device by using a wired/wireless communication module, and may transmit or receive data.

The communicator 1220 may transmit or receive a signal to or from an external device (e.g., a UE), a network (e.g., a core network) or another data transmitting apparatus (e.g., a cell group). The signal transmitted or received to or from the communicator 1220 may include control information and data. The communicator 1220 may include a RF transmitter for up-converting and amplifying a frequency of a signal to be transmitted, and an RF receiver for low-noise amplifying and down-converting a frequency of a received signal. However, this is merely an example of the communicator 1220, and components of the communicator 1220 are not limited to the RF transmitter and the RF receiver.

Also, the communicator 1220 may receive signals through wireless channels and output the signals to the processor 1210, and may transmit signals output from the processor 1210, through wireless channels.

According to an embodiment of the disclosure, the communicator 1220 may transmit or receive data to or from the external device, the network, or the other data transmitting apparatus, in response to control by the processor 1210.

The memory 1230 may refer to hardware to store various data processed by the data transmitting apparatus, and for example, may store a plurality of pieces of data received by the communicator 1220, a plurality of pieces of processed data, and a plurality of pieces of data to be processed.

According to an embodiment of the disclosure, the memory 1230 may store a plurality of instructions (or, a program) and data which are required for operations of the data transmitting apparatus. Also, the memory 1230 may store control information or data included in a signal transmitted or received to or from the data transmitting apparatus. The memory 1230 may be implemented as a storage medium including a read only memory (ROM), a random access memory (RAM), a hard disk, a compact disc (CD)-ROM, a digital versatile disc (DVD), or the like, or any combination thereof. Also, the memory 1230 may refer to a plurality of memories.

The interface unit 1240 may transmit or receive data and commands for interoperations between components in the data transmitting apparatus.

Components in a block diagram may be combined, a component may be added thereto, or at least one of the components may be omitted according to specifications of an apparatus to be actually embodied. That is, at least two components may be combined to one component, or one component may be divided into two components when necessary. Also, functions performed by each component are for describing the embodiments of the disclosure, and detailed operations or devices do not limit the scope of the disclosure.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible via any or a combination of communication networks such as Internet, an intranet, a local area network (LAN), a wide LAN (WLAN), a storage area network (SAN), or the like. The storage device may access, via an external port, a device performing the embodiments of the disclosure. Furthermore, a separate storage device on the communication network may access the electronic device performing the embodiments of the disclosure.

In the afore-described embodiments of the disclosure, a component or components included in the disclosure are expressed in a singular or plural form depending on the described embodiments of the disclosure. However, the singular or plural form is selected appropriately for a situation assumed for convenience of description, and thus, the disclosure is not limited to the singular or plural form, and a component expressed in a singular form may include a plurality of components and components expressed in a plural form may include a single component.

It should be understood that the embodiments of the disclosure in the specification and drawings should be considered in a descriptive sense only and not for purposes of limitation. That is, it will be understood by one of ordinary skill in the art that various modifications in form and details may be made based on the technical concept of the disclosure. Also, the embodiments of the disclosure may be combined to be implemented, when required. For example, the BS and the UE may be operated in a manner that portions of an embodiment of the disclosure are combined with portions of another embodiment of the disclosure. Also, modifications based on the technical scope of the embodiments of the disclosure may be applied to various systems such as a Frequency Division Duplex (FDD) LTE system, a Time Division Duplex (TDD) LTE system, a 5G or NR system, or the like.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a server, of executing a software package in a wireless communication system, the method comprising:
    obtaining package usage information for each of a plurality of software packages with respect to user equipment's (UEs) accessing a plurality of base stations (BSs) connected to the server;
    determining a first hardware component (HC) set, including a plurality of HCs, for processing tasks operating in a first software package from among the plurality of software packages, based on the package usage information including a use for each of the plurality of HCs included in the first HC set and a respective usage amount for the plurality of HCs;
    comparing the respective usage amounts of the plurality of HCs applied to the first software package with a threshold value;
    when there is a HC of which usage amount is equal to or greater than the threshold value from among the plurality of HCs, releasing the HC of which usage amount is equal to or greater than the threshold value;
    generating a second software package that is allocated to the first HC set;
    migrating the tasks operating in the first software package to the second software package; and
    deleting the first software package.

2. The method of claim 1, wherein releasing the HC of which usage amount is equal to or greater than the threshold value comprises:
    determining a second HC set for processing tasks operating in a third software package using the HC of which usage amount is equal to or greater than the threshold value, based on the package usage information;
    generating a fourth software package that is allocated to the second HC set;
    migrating the tasks operating in the third software package to the fourth software package; and
    deleting the third software package.

3. The method of claim 1, wherein the first HC set is determined by comparing preset threshold values with each of an amount of traffic and a mobile edge computing (MEC) service usage amount occurring at the UEs at a particular time.

4. The method of claim 1, wherein, in response to identifying that at least one of an amount of traffic or an MEC service usage amount is predicted to occur by the UEs at a particular time exceeds a threshold value, the allocating of the first HC set to the second software package is performed before the particular time.

5. The method of claim 1, further comprising obtaining event information about an event scheduled for the plurality of BSs and causing a change in traffic or an MEC service usage,
    wherein the package usage information for each of the plurality of software packages with respect to the UEs accessing the plurality of BSs connected to the server comprises traffic and an MEC service usage amount which previously occurred in the plurality of BSs due to each event, and
    wherein the first HC set is determined based on an amount of traffic and an MEC service usage amount which are to occur in the plurality of BSs according to the obtained event information, based on expected amount of traffic and the MEC service usage amount due to the each event.

6. The method of claim 1, wherein each of the plurality of software packages comprises at least one of a virtualized RAN (vRAN) package, an MEC package, or a user plane function (UPF) package.

7. The method of claim 1, wherein each of the plurality of HCs comprises at least one of a central processing unit (CPU), a graphics processing unit (GPU), a field programmable gate array (FPGA), or a network interface controller (NIC).

8. A server for executing a software package in a wireless communication system, the server comprising:
    a communicator;
    a memory storing a plurality of instructions; and at least one processor configured to execute the plurality of instructions to:
obtain package usage information for each of a plurality of software packages with respect to user equipment's (UEs) accessing a plurality of base stations (BSs) connected to the server,
determine a first hardware component (HC) set, including a plurality of HCs, for processing tasks operating in a first software package from among the plurality of software packages, based on the package usage information including a use for each of the plurality of HCs included in the first HC set and a respective usage amount for the plurality of HCs,
compare the respective usage amounts of the plurality of HCs applied to the first software package with a threshold value,
when there is a HC of which usage amount is equal to or greater than the threshold value from among the plurality of HCs, release the HC of which usage amount is equal to or greater than the threshold value,
generate a second software package that is allocated to the first HC set,
migrate the tasks operating in the first software package to the second software package, and
delete the first software package.

9. The server of claim 8, wherein the at least one processor is further configured to execute the plurality of instructions to:
determine a second HC set for processing tasks operating in a third software package using the HC of which usage amount is equal to or greater than the threshold value, based on the package usage information,
generate a fourth software package that is allocated to the second HC set,
migrate the tasks operating in the third software package to the fourth software package, and
delete the third software package.

10. The server of claim 8, wherein the at least one processor is further configured to execute the plurality of instructions to determine the first HC set by comparing preset threshold values with each of an amount of traffic and a mobile edge computing (MEC) service usage amount occurring at the UEs at a particular time.

11. The server of claim 8, wherein the at least one processor is further configured to execute the plurality of instructions to,
in response to identifying that at least one of an amount of traffic or an MEC service usage amount is predicted to occur by the UEs at a particular time exceeds a threshold value, allocate the first HC set to the second software package before the particular time.

12. The server of claim 8, wherein the package usage information for each of the plurality of software packages with respect to the UEs accessing the plurality of BSs connected to the server comprises traffic and an MEC service usage amount which previously occurred in the plurality of BSs due to each event,
the at least one processor is further configured to execute the plurality of instructions to:
obtain event information about an event scheduled for the plurality of BSs and causing a change in traffic or an MEC service usage, and
determine the first HC set based on an amount of traffic and an MEC service usage amount which are to occur in the plurality of BSs according to the obtained event information, based on expected amount of traffic and the MEC service usage amount due to the each event.

13. The server of claim 8, wherein each of the plurality of software packages comprises at least one of a virtualized RAN (vRAN) package, an MEC package, or a user plane function (UPF) package.

14. The server of claim 8, wherein each of the plurality of HCs comprises at least one of a central processing unit (CPU), a graphics processing unit (GPU), a field programmable gate array (FPGA), or a network interface controller (NIC).

15. A non-transitory computer-readable medium comprising a plurality of instructions that, when executed by a processor, are configured to cause the processor to:
obtain package usage information for each of a plurality of software packages with respect to user equipment's (UEs) accessing a plurality of base stations (BSs) connected to a server, wherein the package usage information comprises virtualized RAN (vRAN) package information, user plane function (UPF) package information, and MEC package information;
determine a first hardware component (HC) set, including a plurality of HCs, for processing tasks operating in a first software package from among the plurality of software packages, based on the package usage information including a use for each of the plurality of HCs included in the first HC set and a respective usage amount for the plurality of HCs;
compare the respective usage amounts of the plurality of HCs applied to the first software package with a threshold value;
when there is a HC of which usage amount is equal to or greater than the threshold value from among the plurality of HCs, release the HC of which usage amount is equal to or greater than the threshold value;
generate a second software package that is allocated to the first HC set;
migrate the tasks operating in the first software package to the second software package; and
delete the first software package.

16. The non-transitory computer readable medium of claim 15, wherein the plurality of instructions is further configured to cause the processor to:
determine a second HC set for processing tasks operating in a third software package using the HC of which usage amount is equal to or greater than the threshold value, based on the package usage information;
generate a fourth software package that is allocated to the second HC set;
migrate the tasks operating in the third software package to the fourth software package; and
delete the third software package.

17. The non-transitory computer readable medium of claim 15, wherein the first HC set is determined by comparing preset threshold values with each of an amount of traffic and a mobile edge computing (MEC) service usage amount occurring at the UEs at a particular time.

18. The non-transitory computer readable medium of claim 15, wherein, when it is identified that at least one of an amount of traffic or an MEC service usage amount is predicted to occur by the UEs at a particular time exceeds a threshold value, the plurality of instructions cause the processor to allocate of the first HC set to the second software package before the particular time.

19. The non-transitory computer readable medium of claim 15, wherein the plurality of instructions is further configured to cause the processor to obtain event information about an event scheduled for the plurality of BSs and causing a change in traffic or an MEC service usage,
- wherein the package usage information for each of the plurality of software packages with respect to the UEs accessing the plurality of BSs connected to the server comprises traffic and an MEC service usage amount which previously occurred in the plurality of BSs due to each event, and
- wherein the first HC set is determined based on an amount of traffic and an MEC service usage amount which are to occur in the plurality of BSs according to the obtained event information, based on expected amount of traffic and the MEC service usage amount due to the each event.

20. The non-transitory computer readable medium of claim 15, wherein each of the plurality of software packages comprises at least one of a virtualized RAN (vRAN) package, an MEC package, or a user plane function (UPF) package.

* * * * *